(12) United States Patent
Zguris

(10) Patent No.: US 6,306,539 B1
(45) Date of Patent: *Oct. 23, 2001

(54) MAT OF GLASS AND OTHER FIBERS IN A SEPARATOR OF A STORAGE BATTERY

(75) Inventor: George C. Zguris, Canterbury, NH (US)

(73) Assignee: KVG Technologies, Inc., East Walpole, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/261,646

(22) Filed: Mar. 3, 1999

Related U.S. Application Data

(63) Continuation-in-part of application No. 08/923,876, filed on Sep. 2, 1997, now Pat. No. 6,071,641.

(51) Int. Cl.⁷ .............................. H01M 2/16; H01M 4/56
(52) U.S. Cl. ..................... 429/144; 429/225; 429/142; 429/141; 429/129; 429/251; 429/249; 429/248; 429/247
(58) Field of Search .................. 429/247, 248, 429/249, 251, 129, 141, 142, 144, 225

(56) References Cited

U.S. PATENT DOCUMENTS

| | | |
|---|---|---|
| 2,117,371 | 5/1938 | Slayter . |
| 2,311,613 | 2/1943 | Slayter . |
| 2,339,431 | 1/1944 | Slayter . |
| 2,477,000 | 7/1949 | Osborne . |
| 2,484,787 | 10/1949 | Grant . |
| 2,734,095 | 2/1956 | Mears et al. . |
| 3,085,126 | 4/1963 | Labino . |
| 3,338,777 | 8/1967 | Irwin et al. . |
| 3,608,166 | 9/1971 | Gruget . |
| 4,205,122 | 5/1980 | Miura et al. . |
| 4,216,280 | 8/1980 | Kono et al. . |
| 4,216,281 | 8/1980 | O'Rell et al. . |
| 4,245,013 | 1/1981 | Clegg et al. . |
| 4,336,314 | 6/1982 | Yonnezu et al. . |
| 4,359,511 | * 11/1982 | Strzempko ..................... 429/252 |
| 4,363,856 | 12/1982 | Waterhouse . |
| 4,367,271 | 1/1983 | Hasegawa et al. . |
| 4,373,015 | 2/1983 | Peters et al. . |
| 4,387,144 | 6/1983 | McCallum et al. . |

(List continued on next page.)

FOREIGN PATENT DOCUMENTS

| | | |
|---|---|---|
| 55053065 | 4/1980 | (JP) . |
| 55091564 | 7/1980 | (JP) . |
| 55146872 | 11/1980 | (JP) . |
| 07-147154 | 6/1995 | (JP) . |
| 09-92252A | 4/1997 | (JP) . |
| 97116846 | 9/1997 | (JP) . |
| WO98/12759 | 3/1998 | (WO) . |

OTHER PUBLICATIONS

Ceramic and Glass—vol. 4 of the "Enginneered Materials Handbook"–published by ASM International, 1991.

Primary Examiner—Gabrielle Brouillette
Assistant Examiner—Angela J. Martin
(74) Attorney, Agent, or Firm—John C. Purdue; David C. Purdue

(57) ABSTRACT

Methods and materials for producing microfibers, and methods or collecting the formed fibers as mats, either by themselves or with various additive, are disclosed. The mats are masses of intermeshed glass or other fibers produced by suspending the fibers in a gaseous medium, and collecting the suspended fibers on a foraminous material. The fibers suspended in the gaseous medium have a BET surface area of from 0.2 to 5 m² per gram. A method for adding additional materials to the mats is also disclosed; this method involves suspending the additives in the gaseous medium with the fibers.

30 Claims, 11 Drawing Sheets

U.S. PATENT DOCUMENTS

| | | |
|---|---|---|
| 4,465,748 | 8/1984 | Harris . |
| 4,522,876 | 6/1985 | Hiers . |
| 4,529,677 * | 7/1985 | Bodendorf ............................ 429/252 |
| 4,648,177 | 3/1987 | Uba et al. . |
| 4,908,282 * | 3/1990 | Badger .................................... 429/59 |
| 5,009,971 | 4/1991 | Johnson et al. . |
| 5,075,184 | 12/1991 | Tanaka et al. . |
| 5,076,826 | 12/1991 | Teeter . |
| 5,091,275 * | 2/1992 | Brecht et al. ......................... 429/247 |
| 5,180,647 | 1/1993 | Rowland et al. . |
| 6,071,641 * | 6/2000 | Zguris ................................... 429/144 |
| 6,071,651 | 6/2000 | Forte et al. . |
| 6,108,879 | 8/2000 | Forte et al. . |
| 6,143,441 * | 11/2000 | Zguris et al. ........................ 429/144 |

* cited by examiner

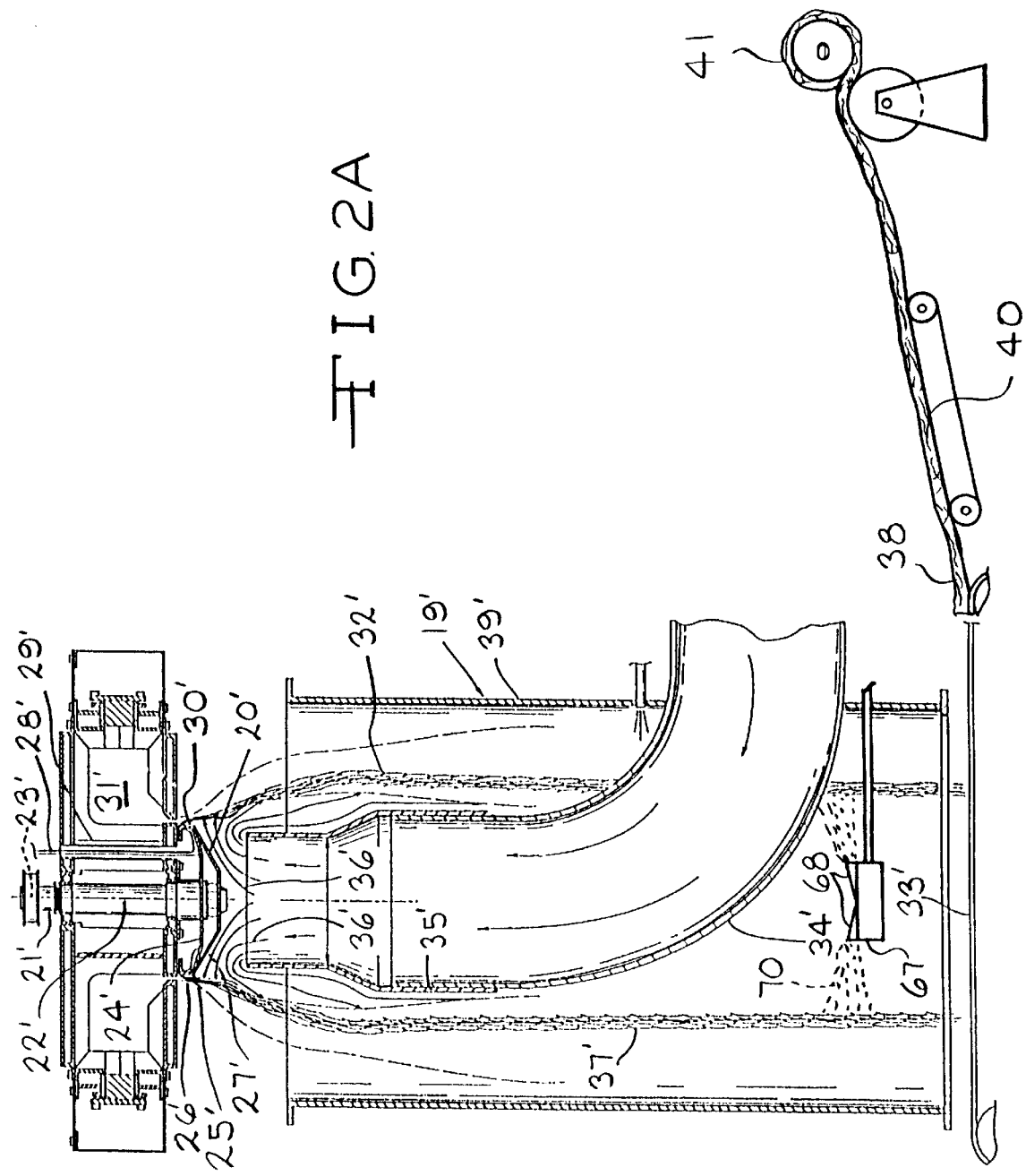

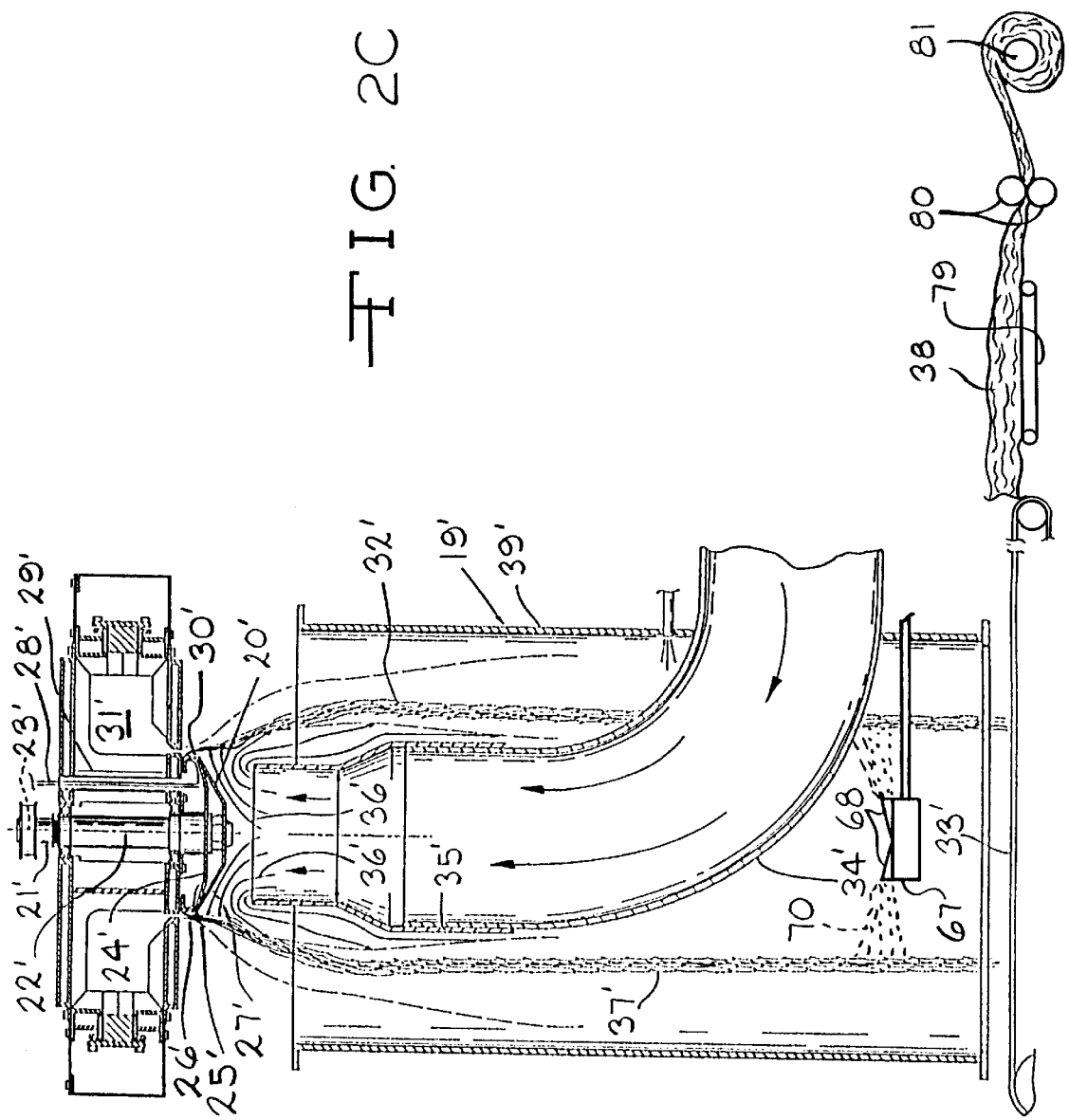

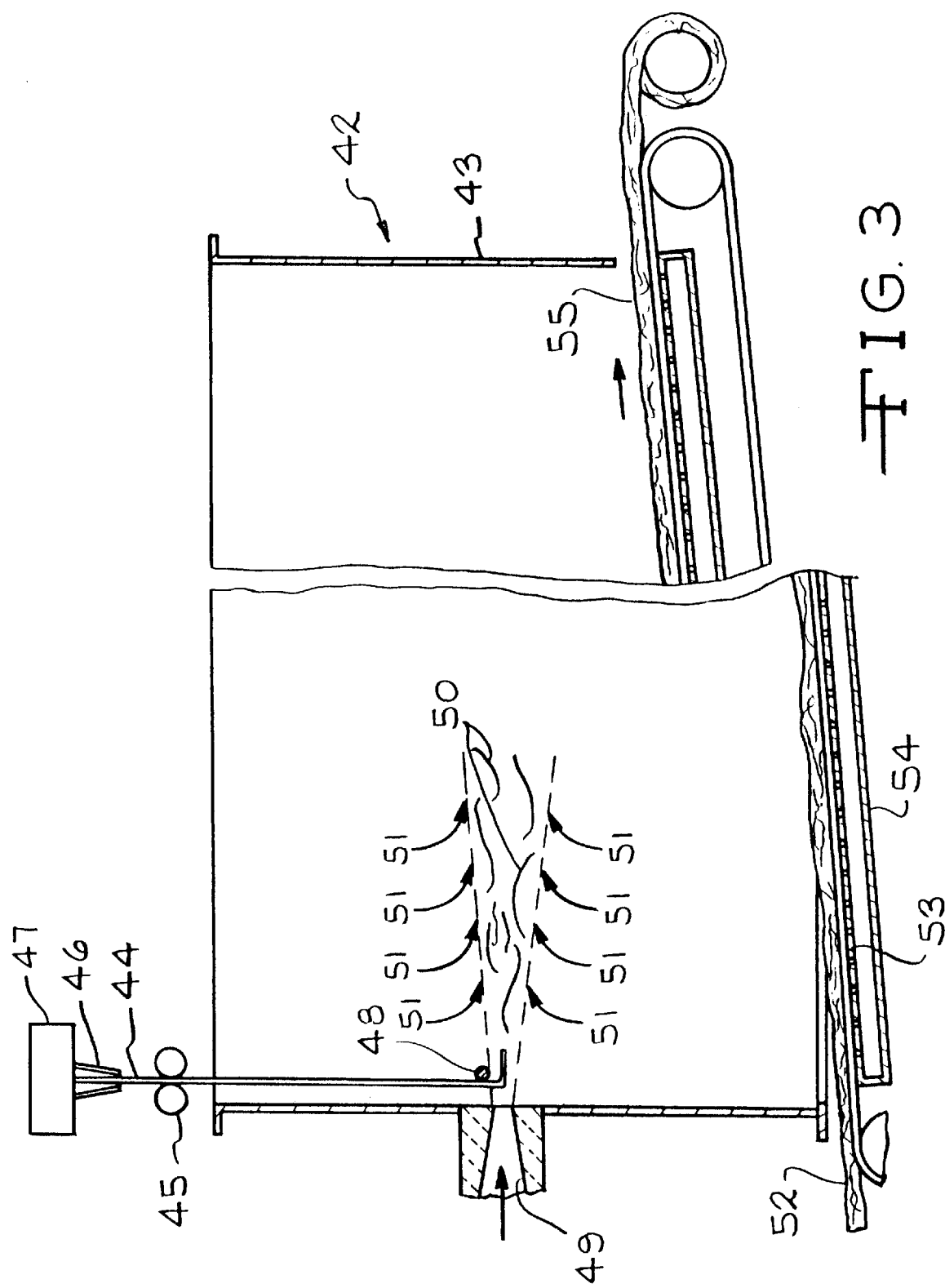

MAT OF GLASS AND OTHER FIBERS IN A SEPARATOR OF A STORAGE BATTERY

REFERENCE TO RELATED APPLICATION

This is a continuation in part of application Ser. No. 08/923,876, filed Sep. 2, 1997, now U.S. Pat. No. 6,071,641, granted Jun. 6, 2000.

BACKGROUND OF THE INVENTION

1. Field of the Invention

The present invention relates generally to the field of batteries and, more specifically, to batteries in which mat containing glass fibers, commonly called separators, are positioned between the positive and negative plates and to a method for producing such mats or separators and batteries. As is subsequently discussed in more detail, separators containing glass fibers are well known. Long before glass fiber separators, however, cedar veneers were used as a separator material, and were replaced by microporous, hard rubbery separators and cellulose separators impregnated with resins.

2. Description of the Prior Art

Valve regulated ("sealed"—"recombinant") lead acid (VRLA) batteries are known; they usually comprise a plurality of positive and negative plates, as in a prismatic cell which can be a prismatic flat plate, or in layers of separator and positive and negative electrodes wound together, as in a "jelly roll" cell. The plates are arranged so that they alternate, negative - positive - negative, etc., with separator material separating each plate from adjacent plates. The separator, typically composed of a mat of wet laid nonwoven glass fibers, is an inert material; it stores battery acid, and provides low electric resistance. In addition, in VRLA batteries, the separator material provides innumerable gas channels between the plates through which oxygen can migrate from the positive electrode, when generated there, to the negative electrode where it can be recombined with hydrogen, according to the oxygen cycle. Another important function of a separator is to exert pressure against the plate paste or active material which forces the paste into contact with the plate, and causes a pressure between the positive active material and the positive grid and between the plates, ensuring that there is not an interface at which corrosion. which would cause premature capacity loss (PCL), can occur.

Glass fiber separator material has been produced commercially by wet processes on paper making equipment including fourdrinier machines and rotoformers, inclined fourdrinier machines and extended wire rotoformers. In the production of separator made of glass fibers for VRLA batteries, it is preferred that no organic binder be added to a furnish from which separator sheets are made; the entanglement of individual microglass fibers serves to maintain the sheet in a cohesive structure, and water glass or any of various sulfate salts, which sometimes form on the fiber surfaces, serves as a binder. Organic binders, however, tend to decrease the ability of a separator to wick acid, and to decrease the amount of acid a separator can hold. A great deal of work has been directed to modifying the glass fiber furnish from which separators are produced to improve battery performance and/or lower the cost of the separator. Some of the work has entailed the addition of synthetic fibers for various reasons, such as the use of thermoformable plastic fibers so that the separator can be heat sealed on its edges to envelop a plate. Other work, which pertains to the field of this invention, has been directed to the use of a filler, e.g., silica, or another siciciferous material, to provide separators which are comparable to all glass fiber separators, at a lower cost. Separators made from glass fibers to which cellulose has been added and polyolefin fibers to which cellulose has been added have also been suggested. Prior art patents are discussed below.

U.S. Pat. No. 4,465,748 (Harris) discloses glass fiber sheet material for use as a separator in an electrochemical cell, and made from 5 to 35 percent w/w of glass fibers less than 1 $\mu$m in diameter; the patent also discloses a glass fiber sheet for such use wherein there are fibers of a continuous range of fiber diameters and lengths, and most of the fibers are not over 5 mm in length.

U.S. Pat. No. 4,216,280, (Kono et al.), discloses glass fiber sheet material for use as a plate separator in a battery, and made from 50 to 95 percent w/w of glass fibers less than 1 $\mu$m in diameter and 50 to 5 percent w/w of coarser glass fibers. The coarser glass fibers, the reference says, have a fiber diameter larger than 5 $\mu$m, preferably larger than 10 $\mu$m, and it is advantageous for some of the coarser fibers to have diameters of 10 $\mu$m to 30 $\mu$m.

U.S. Pat. No. 4,205,122 (Minra et al.) discloses a battery separator of reduced electric resistance comprising a self supporting, non woven mat consisting essentially of a mixture of olefinic resin fibers having a coarseness of from 4 to 13 decigrex and olefinic resin fibers having a coarseness of less than 4 decigrex, the latter fibers being present in an amount of not less than 3 parts by weight per 100 parts by weight of fibers; up to about 600 parts by weight of inert filler materials per 100 parts by weight of fibers can also be used. The battery separator is produced by subjecting a suitable aqueous dispersion to a sheet-forming operation, drying the resulting wet, non-woven mat, and heat treating the dried mat at a temperature ranging from a point 20° C. lower than the melting point of the aforementioned fibers to a point about 50° C. higher than the melting point.

U.S. Pat. No. 4,216,281 (O'Rell et al.) discloses a separator material produced from a furnish containing 30 to 70 percent w/w of polyolefin synthetic pulp, 15 to 65 percent w/w of a siliceous filler and 1 to 35 percent w/w of "long" fibers which can be polyester fibers, glass fibers, or a mixture of the two. Cellulose in an amount up to about 10 percent w/w is disclosed as an optional ingredient of the furnish.

U.S. Pat. No. 4,336,314 (Yonnezu, et al), assigned to Japan Storage Battery Company, discloses a pasted lead acid battery with greatly extended service life and capacity over the usuable service life therof. The battery has a glass mat, which may be of a dual layer construction, disposed adjacent positive plates of assembled elements. This patent teaches the importance of pressure that must be applied to the assembled elements, for example by a binding band, or from outside the battery container. As the pressure applied to the elements increases, the patent says, the charge and discharge cycle life increases although the relationship is said not to be linear. That is, in a pressure range of from 40 to 60 g/dm$^2$, the life is abruptly increased by a factor of 2 to 2.5 as the pressure increased. Therefore, up to about 100 kg/dm$^2$, the life remains substantially unchanged. However, if pressure exceeds about 100 kg/dm$^2$, the life decreases. The tendency to decrease depends on the type of glass mat used. The life of the lead acid cell using the glass mat having a dual layer structure was found to be excellent at a low pressure range while the life of such cell increases by a fator of about two at a pressure of 20 kg/dm$^2$.

The patent also states that the pressure applied to the assembled element presses on each plate and prevents the aforementioned expansion effect attributed to changes in structure of the active material layer. During use, it is necessary to prevent a reduction of the degree of pressure. It was found that the greatest cause for the reduction of the pressure applied to the assembled element is that, when the glass mat is wetted, its thickness decreases. The patent discloses that the degree of reduction of pressure applied to the glass mat depends upon the technique used in fabricating the glass mat. In general it is stated that it is desirable in a glass mat employed in a lead acid battery for the degree of pressure applied when the mat is immersed in dilute sulfuric acid to be more than 70% of the degree of pressured applied in the dry state. The importance of pressure was clearly noted and the main solution was external pressure devices. The method of making the glass material was not stated but a Japanese disclosure, No. 5505306 JPA1 issued to applicant: Japan Storage Battery Company Ltd., discloses a dual layer glass mat produced by a wet laid process. U.S. Pat. No. 4,336,314 refers to a Japanese Patent Office publication number, 55091564 JP A1, which is said to have a date of publication of Jul. 11, 1980.

U.S. Pat. No. 4,363,856 (Waterhouse) discloses a separator material made from a furnish composed of polyolefin pulp fibers and glass fibers, and names polyester staple fibers, polyolefin staple fibers and cellulose pulp fibers as alternative constituents of the furnish.

U.S. Pat. No. 4,387,144 (McCallum) discloses a battery separator having a low electrical resistance after extended use which is made by thermal consolidation and thermal embossing of a paper web formed from a furnish containing a synthetic pulp composed of fibrils which are filled with an inorganic filler, the web incorporating a wetting agent which is preferably an organic sulfonate, an organic succinate, or a phenol ethoxylate.

U.S. Pat. No. 4,373,015 (Peters et al.) discloses sheet material for use as a separator in a battery, and "comprising organic polymeric fibers"; both of the examples of the reference describe the sheet material as "short staple fiber polyester matting about 0.3 mm thick", and indicate that the polyester fibers range from about 1 $\mu$m to about 6 $\mu$m in diameter.

Sheet separators for use in conventional (not valve regulated) batteries and comprising both glass fibers and organic fibers are disclosed in all of the following U.S. Pat. No. 4,529,677 (Bodendorf); U.S. Pat. No. 4,363,856 (Waterhouse); and U.S. Pat. No. 4,359,511 (Strzempko).

U.S. Pat. No. 4,367,271, Hasegawa, discloses storage battery separators composed of acrylic fibrils in an amount of up to about 10 percent w/w, balance glass fibers.

Japanese patent document 55/146,872 discloses a separator material comprising glass fibers (50–85 percent w/w) and organic fibers (50–15 percent w/w).

U.S. Pat. No. 4,245,013, Clegg et al., discloses a separator made by overlaying a first sheet of fibrous material including polyethylene fibers with a second sheet of fibrous material including polyethylene and having a synthetic pulp content higher than the first sheet.

U.S. Pat. No. 5,009,971, Johnson et al., discloses a porous flexible sheet of about 93 to 99.5 weight percent amorphous precipitated silica and from about 0.5 to about 7 weight percent fibrillated, unsintered polymeric material, e.g., polytetrafluoroethylene. The sheet is prepared by subjecting a dry homeogeneeous mixture of the silica and polymeric material, e.g., polytetrafluoroethylene, in the above proportions to mechanical shear blending forces to finrillate the polymer, and thereafter dry forming the resulting admixture into a sheet form.

U.S. Pat. No. 4,908,282, Badger, discloses a separator comprising a sheet made from first fibers which impart to the sheet an absorbency greater than 90% and second fibers which impart to the sheet an absorbency less than 80% wherein the first and second fibers are present in such proportions that the sheet has an absorbency of from 75 to 95%. This patent discloses that fine glass fibers have a high absorbency, that coarse glass fibers have a low absorbency, and that hydrophobic organic fibers have an extremely low absorbency, and that, when this separator is saturated with electrolyte, unfilled voids remain so that gas can transfer from plate to plate for recombination. The disclosure of Badger is incorporated herein by reference.

U.S. Pat. No. 5,091,275 (Brecht et al.) discloses a glass fiber separator which expands when exposed to electrolyte. The separator comprises glass fibers which are impregnated with an aqueous solution of colloidal silica particles and a sulfate salt. The separator is produced by forming a paper making web of glass fibers, impregnating the web with the aqueous mixture of silica and the salt, lightly compressing the impregnated web to remove some of the aqueous solution, partially drying the web, compressing the web to a final thickness and completing the drying of the web. The web is preferably compressed to a thickness which is less than the distance between plates in a given cell, so that insertion of an assembled cell stack into a case is facilitated. When electrolyte is added to the case, the salt dissolves in the electrolyte and the separator expands to provide good contact between the plates and the separators. According to the patent, the silica contributes to the recombination performance of cells incorporating the precompressed separator. The silica also contributes a great deal of stiffness to the separator, so much so that the separator may be characterized as rigid.

It has been determined that the production of battery separator by paper-making techniques from a furnish of glass fibers and silica powder leads to problems which are caused by variations in the concentration of the silica powder in the furnish. Typical glass fiber furnishes have a liquid content exceeding 98 percent w/w. In the course of making separator sheets, the furnish flows from a headbox onto an advancing screen through which most of the water flows in the first few feet. The water, known as white water, is recycled and winds up back in the headbox of the machine. If the furnish is composed exclusively of glass fibers, virtually none of the fibers pass through the wire and wind up in the white water. However, furnishes comprising glass fibers and silica powder do not fare so well. In the absence of a retention aid, significant amounts of silica powder from such furnishes do pass through the paper making wire and wind up in the white water. Left unchecked, this phenomenon causes the concentration of silica powder in the furnish to increase, undesirably changing the properties of the furnish. Heretofore, the problem of silica powder and the like passing through a paper making wire has been avoided through the use of binders and retention aids.

U.S. Pat. No. 2,477,000 discloses a synthetic fiber paper produced from fibrillae and fibers made by methods wherein a solution of the fiber is extruded through very small orifices (spinnerets).and the extruded solution is allowed to congeal in a precipitating bath, by evaporation of the solvent, or by temperature changes (see column 2, lines 25 and following). The patent says that fibers of cellulose acetate, cellulose nitrate, regenerated cellulose from viscose, "Vinylite (a synthetic resin made by polymerization of vinyl compounds), Aralac (a fibrous product made from skim milk casein), and spun glass" which range in length up to 1 inch and in diameter from 12–80 microns and fibrillae preferably derived from flax, Manila hemp, caroa or hemp can be used to make the paper. At least 90 percent of the fibrillae should be from 0.0015 to 0.0025 inch in length and from 0.0000027 to 0.0000044 inch in width.

WO 98/12759, an International Application published Mar. 26, 1998, discloses "A resilient fibrous mat, preferably made of microfibers (which) is especially adapted for use as a battery separator for starved electrolyte batteries . . . The fibrous mat, with one or two surface layers, can be formed from an air laid fibrous blanket by subjecting one or both surfaces of the blanket to hydro entanglement to increase the entanglement of the fibers at and adjacent the major surface (s) relative to the entanglement of the fibers in the resilient fibrous layer. The fibrous mat with a substantially uniform density may be made by flooding the blanket with a liquid and drawing a vacuum through the blanket."

European Patent Application 97116846, Japan Vilene Co., Ltd., filed Sep. 29, 1997, published as EP 0834932 A2, shows the kind of entanglement disclosed in WO98/12759 to produce the material of FIGS. 1 and 2 thereof, but applied to the entire body of the separator material rather than to a region or regions adjacent one or both major surfaces as in WO98/12759.

An English language abstract of a published Japanese patent application (07147154, published Jun. 6, 1995), entitled SEPARATOR FOR ALKALINE BATTERY states:

"A fiber having a section form shown in (c) of the drawing, for example, is constituted from 0.04 to 0.12 deniers of circular and petal polypropylene component 2 and 0.12 denier of a polyethylene component 1. A hundred percent of this dividing composite fiber with a fineness of 2 deniers and a fiber length of 38 mm is opened by a card machine to laminate unidirectional and cross fiber webs with METSUKE of 1.3 and 52 f/m$^2$. This is treated from both surfaces with a water flow having a water pressure of 130 kg/cm$^2$ on a nozzle plate having a nozzle diameter of 0.13 mm and a pitch of 0.6 mm. This cloth is dipped in fuming sulfuric acid, sulfonated, and then calendered to provide a separator having a METSUKE of 65 g/m$^2$ and a thickness of 0.15 mm. The same treatment can be performed in constitutions other than (c) in the drawing. Thus, excellent electrolyte resistance, oxidizing property, and liquid holding property are provided, and a battery can be smoothly operated for a long period."

BRIEF DESCRIPTION OF THE INSTANT INVENTION

The instant invention is based upon the discovery that a binderless glass fiber mat suitable for use as a separator for Valve regulated ("sealed"—"recombinant") lead acid (VRLA) batteries can be produced by a dry process by collecting the fibers from fiberizing apparatus, without subjecting them to a wet paper making or other post forming process, and selecting portions of the collected fibers which are sufficiently uniform in thickness and grammage for use as battery separators. In a preferred embodiment, fibers can be entwined by the air flow in a collection duct to produce a superior separator material. In contrast, the use of the wet process to produce separators typically necessitates baling of the glass fibers as produced, and their redispersion to form a web. The requirement of making glass microfibers for use as a papermaking fiber requires that, unless the fibers are degraded excessively in the papermaking process, the fiber is manufactured to a suitable shorter length than would otherwise be possible to enable the fiber to undergo subsequent operations in the papermaking process. The process of delivering a fiber to a wet process paper machine (sometimes called a "former") usually requires the baling of the fibers, opening the bales, adding the open bales into a mixer commonly referred to as a pulper, and then expending sufficient energy to disperse or break apart the fibers in the water slurry so that adequate uniformity of the fibers in the slurry is achieved. A description of the art can be found in a paper published by TAPPI Press in the 1985 Nonwoven Symposium proceedings (ISSN 0272-7269). The paper is entitled "Important Factors In Glass Web Manufacturing" (Frey, et al ). Some important issues which are discussed in the paper emphasize the value of the instant discovery. The paper states, concerning stock preparation, that the dispersion of glass microfibers is a critical step in the manufacture of glass papers. The fibers are very brittle and are easily reduced to sand if too much energy is used for dispersion. Table 1 of the paper lists pulping, pH, water temperature, stock consistency and pulping time as important variables having been named by either manufacturer's literature or papers published by the manufacturers.

Rotary fibers have been described as more easily dispersed than flame /attenuated fibers and also as being more easily damaged by excess agitation. Flame attenuated fibers can also be seriously damaged by too much pulping. In general the minimum amount of agitation required to achieve acceptably uniform distribution of the glass fibers is used.

It is also known to one skilled in the art that even the packaging of fibers can cause difficulty in dispersing them. In short, the papermaking process requires the fibers to have been manufactured so that they can be suitably dispersed; any shortcomings in the fiber forming process must be offset by an increase in the amount of energy employed in producing a slurry to achieve a suitable uniformity of the fiber in the final separator. Increased degradation of the fibers is a consequence of any increase in the amount of energy employed in producing the slurry.

The relationship between the fiber forming process and the energy required to produce a satisfactory paper-making slurry from the fibers produced is noted in Manville Tempstran® Battery Separator Application data sheet MFI printed 12/86. This data sheet discusses the Tempstran Micro-fiber as producing superior separator paper, which means an article of manufacture made by the wet laid process. The Manville Tempstan publication quotes the following:

"Fiber dispersion is accomplished in typical pulping equipment such as a Hollander beater or HCV hydropulper. Pulping should be of minimum duration, only long enough to open up and separate the fibers. Utilize minimum shear to maintain maximum fiber length since fiber entanglement is a prime bonding mechanism."

It should be noted that Manville is known today as Johns Manville and is the largest producer of mcirofiber for the wet laid process Even a current patent application, WO 98/12759, filed by Johns Manville, although it discusses the problems with papermaking, as noted above, fails to show an appreciation that it is possible to select separator material to achieve the requisite degree of uniformity or that it is possible to control the glass fiber making process so that longer fibers can be produced, and can be entwined by the air flow in the collection duct As is noted above, one of the principle attributes of microglass separator is that it imparts to the VRLA battery in which it is used the compression resiliency of the microglass. Nevertheless, as can be seen from the above discussion the prior art had produced a sheet that had fiber length that had to be made shorter and less entangled to allow for subsequent dispersion. This produced a sheet that was less than optimum for the separator to impart the most force onto the paste and subsequently to the paste-grid interface. Therefore, another aspect of the instant invention is an improved separator made by a dry process, and composed of fibers having greater lengths that would be possible in wet laid separator. The fibers in this separator can be specially twisted and entangled to provide for improved compression-recovery properties by readjustment of airflow collection ducting, temperature of the glass melt, the glass chemistry to affect such properties of the glass as the liquidus temperature and the manner of collecting and forming of the microglass fibers. Also, since the fibers do not need to be redispersed, additives can be introduced during the collection process to enhance the properties of the separator.

Glass fibers produced by the flame blown process, which is subsequently described in more detail, can be conveyed to, and wound on a drum until a mat weighing about 1,000 grams per square meter has been collected; the mat can then be slit transversely, and removed from the drum as sheets weighing about 1,000 grams per square meter. having one dimension which equals the circumference of the drum, and another which equals the width of the drum. This mat, which has, in a typical example, an average fiber diameter of 0.8 $\mu$m, can be separated into layers having the weight in grams per square meter desired in a given battery separator, and the layers can be cut to size and used as separators, as subsequently described in more detail. Web having the targeted grammage can also be taken directly from the drum or from the conveyor before it reaches the drum. In the alternative, glass can be fiberized by another method which is controlled so that a continuous sheet having the targeted grammage is produced.

A glass fiber mat which can be used in practicing the instant invention can also be made by what is called "the rotary process" in glass forming apparatus which includes a glass melting tank, a rapidly rotating centrifugal bushing with small openings in a periphery, at least one high pressure hot gas nozzle from which a high velocity fiberizing jet is directed across the periphery of the centrifuge, and a collecting conveyor. Molten glass fed to the centrifugal bushing is caused by centrifugal force to flow through the peripheral openings of the bushing into the fiberizing jet, by which the streams of glass are attenuated and carried onto a collecting conveyor which is pervious to the gas. The mat from this process can also be collected on a drum, slit transversely, and removed from the drum as sheets which, again can weigh about 1,000 grams per square meter, and can be composed of fine fibers, average fiber diameter 0.8 $\mu$m when the rotary process is that of U.S. Pat. No. 5,076,826, or can range up to about 3 $\mu$m when other rotary processes are used. This mat can also be separated into layers having the weight in grams per square meter desired in a given battery separator, and the layers can be cut to size and used as separators, as subsequently described in more detail. This web having the targeted grammage and thickness can also be taken directly from the drum, or from the conveyor before it reaches the drum.

It has been found by examination, using a scanning electron microscope, of mat produced as described in the two preceding paragraphs and collected on a drum, that the mat is formed in discrete layers, each of which is composed of the fibers deposited during one revolution of the collecting drum, and that there is a fiber diameter gradient within each of the discrete layers, the fibers of the smallest diameter being concentrated adjacent one major surface of each layer, and the fibers of the largest diameter being concentrated adjacent the other major surface. A part of the increased resilience of battery separator according to the invention is attributed to the observed layering, and another part is attributed to the gradient in fiber diameter within each layer. It will be appreciated that separator material can also be produced by a wet papermaking process where similar layering occurs, for example, by casting a plurality of slurries of glass or other fibers, the first on the screen of paper making apparatus, and the second and subsequent ones on the previously cast fibers, or by assembling a plurality of thin sheets of glass or other fibers made by a wet process to produce a composite separator having the desired thickness and grammage. Accordingly, in one aspect, the invention is a battery separator composed of a plurality of thin sheets of non-woven fabric assembled to constitute the separator, and the thin sheets can be made by an air-laid or by a wet process.

Thinner sheets of the glass fiber mat can also be produced by either the flame blown process or by the rotary process, including that of U.S. Pat. No. 5,076,826, and enough of the thinner sheets to provide the desired grammage, which usually ranges from about 20 to about 1000 g.m$^{-2}$ can be stacked, and then cut to size. To produce the thinner sheets, glass fibers can be produced from softened glass and collected in a conventional manner, usually on a foraminous conveyor, and the speeds of the fiberizing process and of the conveyor can be set so that a mat having the desired grammage is conveyed from the forming operation, and either rolled for future use, or cut to size, in which case it can be used immediately to produce batteries, or stacked for future use. The continuous sheet can also be collected with a cross-lapper to improve its uniformity. The continuous or sheeted material can also be enhanced by additional processes such as precompressing the material to provide improved ease of battery assembly or improved thickness control. Various additives can also be introduced into the mat to improve other properties as required by the specific separator.

When a battery is produced, at least one stack of alternating positive and negative plates is assembled, with separator between adjacent plates, and the separator of each stack is compressed so that the stack can be slipped into a pocket which is a part of the case of the battery. It is important that the separator have sufficient resiliency, after such compression, that it exerts the required pressure against the paste or active material on each plate to force the paste into contact with the plate, and to cause a pressure between the plates, ensuring that there is an interface, along the faces of the plates, among the plate paste or active material, the electrolyte and oxygen. A standard test has been developed to measure the resiliency of a separator material. The results of this test, as is subsequently explained in more detail, indicate that separators in batteries according to the invention are significantly more resilient than otherwise identical separators made from different samples of the same glass fibers, but by a conventional wet paper making process.

OBJECTS OF THE INVENTION

It is, therefore, an object of the instant invention to provide an improved VRLA or other battery containing a separator composed, at least predominantly, of glass fibers as collected from a fiber forming process, i.e., without having been subjected to a wet paper making process or to a post forming process such as that called an "airlaid" or spunlaced, or to another post forming, secondary process It is another object to provide a method for producing a battery separator composed predominantly of glass fibers.

It is yet another object to provide a glass fiber VRLA separator which has better resiliency than a separator made by the wet paper making process from the same fibers.

It is yet another object to provide a glass fiber VRLA separator which has better resiliency than a separator made by the wet paper making process from the same fibers and by which the fibers retain their fiber length to a greater percentage.

It is yet another object to provide a glass fiber VRLA separator that is composed of longer fibers of the same fiber diameter than would be present in such a separator made from the same fibers by a wet paper making process.

It is still another object to provide a glass fiber VRLA battery separator which has greater resiliency, by comparison with previously known separators, and, as a consequence, can be 10 to 50 percent lighter in weight per unit of area (grammage) but still provide the same "BCI" (Battery Council International) thickness as conventional wet laid separator, i.e., 300 grams per square meter for separator having a BCI thickness of 2.13 millimeters, which is determined by measuring the thickness of a one square inch portion of the separator when a load of 1.5 psi is applied to a one square inch footer which bears on that portion of the separator.

It is yet another object to provide a VRLA battery separator which has improved resilience and shock absorbing properties because it is composed of a plurality of separate layers.

It is a further object to provide a glass fiber VRLA separator which has greater absorbency for a battery electrolyte than does a separator made by the wet paper making process from the same fibers.

It is still another object to provide a glass fiber VRLA separator material in which the average fiber length is greater than in a separator made by the wet paper making process from the same fibers because the fiber breakage associated with the paper making or post forming redispersing and forming processes does not occur.

It is yet another object to provide a separator that is composed of multiple, separately formed layers of glass or other fibers.

It is yet another object to provide a separator that is composed of multiple, separately formed layers of glass or other fibers and has siliciferous materials added into the separator to enhance the drip rate of the separator and increase the surface area to influence the absorption and deabsorption of the electroylte during the charge and discharge reactions of the battery.

It is yet another object to provide a separator that is composed of multiple, separately formed layers of glass or other fibers or other polymers to improve toughness, wetability, or both of the separator.

It is yet another object to provide a separator that is composed of multiple, separately formed layers of glass or other fibers with inorganic salts and binders added, and that has been pressed to form a press compressed separator that has greater compression resiliency than a comparable wet laid separator.

It is yet another object to provide a separator that is composed of multiple, separately formed layers of glass or other fibers with inorganic salts and binders added, and that has been pressed to form a press compressed separator that, has greater compression resiliency than a comparable wet laid separator and placed in a battery so that a semi-jelled battery can be produced by the addition of sulfuric acid without the need for adding silica to the acid introduced into the battery.

It is still a further object to provide a Separator which has a given mean BET thickness, produced by suspending fibers in air or another gas, and collecting the suspended fibers on a foraminous conveyor.

It is still a further object to provide a process and a material made by the process wherein, after the fibers are formed and while they are being attenuated, other additives that have been introduced into the air mixture that is supplied by the center air supply tube ale introduced into the mat to provide enhanced physical properties of the composite material so formed. The material so produced has utility as a separator, but can also have utility as a filter medium, thermal insulation or sound barrier medium. The additives that can be introduced include siliceriferous materials, inorganic salts, organic particles, and thermal binders to mention a few.

It is still a further object, in a method for producing a glass fiber mat which includes introducing air to the fiberizing process through a central supply air duct, to introduce into the central duct a modifier which coats the fibers as they are formed and makes them adhesive so that they can be adhered to a porous or solid web, film or foil.

Other objects and advantages will be apparent from the description which follows, reference being made to the attached drawings.

DEFINITIONS

As used herein, the term "percent v/v" means percent by volume; the term "percent w/w"and the symbol % mean percent by weight; the term "wire", as applied to a paper making machine, means the surface of the machine on which a furnish is cast in producing paper, and can be, for example, the screen of a Fourdrinier machine or the vacuum drum of a rotoformer machine; pore sizes reported herein, unless otherwise indicated, are in microns, and are determined by the first bubble method or by liquid porosimetry, Coulter; all temperatures are in ° C.; all grammages are reported herein in grams per square meter, but ill determinations are made in grams per square inch of separator material and are converted to grams per square meter; and the following abbreviations have the meanings indicated: $\mu$m=micron or microns; mg=milligram or milligrams; g=gram or grams; kg=kilogram or kilograms; l=liter or liters; ml=milliliter or milliliters; cc=cubic centimeter or cubic centimeters; pcf= pound per cubic foot or pounds per cubic foot; m=meter or meters; cm=centimeter or centimeters; mm=millimeter or millimeters; mil=inch$\times 10^{-3}$ or inches$\times 10^{-3}$ (multiply times 25.4 to convert to mm); kPa=pressure in thousands of Newtons per square meter: psi=pounds per square inch (multiply times 6.89 to convert to kPa); and kN=force in thousands of Newtons.

BRIEF DESCRIPTION OF THE DRAWINGS

FIGS. 2 and 2a are vertical sectional views which show different parts of apparatus for producing a glass fiber mat by what is called "the rotary process"; the mat can be used as collected from the fiber forming process, i.e., without having been subjected to a wet paper making process, to produce a battery according to the invention; together, FIGS. 2 and 2a constitute a schematic representation of the apparatus.

FIG. 2c is a vertical sectional view which shows still another embodiment of the apparatus of FIG. 2a; in the FIG. 2c embodiment, glass fiber mat produced by the rotary process is rolled for future use as separator material in producing batteries.

FIG. 3 is a schematic representation similar to a part of the apparatus of FIG. 2a, showing different apparatus which can be used to produce a glass fiber mat by what is called "the flame blown" process; the apparatus of FIG. 3 can be used alone to produce a mat or with the apparatus of FIG. 2 to produce a glass fiber mat that can be used as collected from the fiber forming process to produce a battery according to the invention.

DESCRIPTION OF THE PREFERRED EMBODIMENTS

Figure 1:
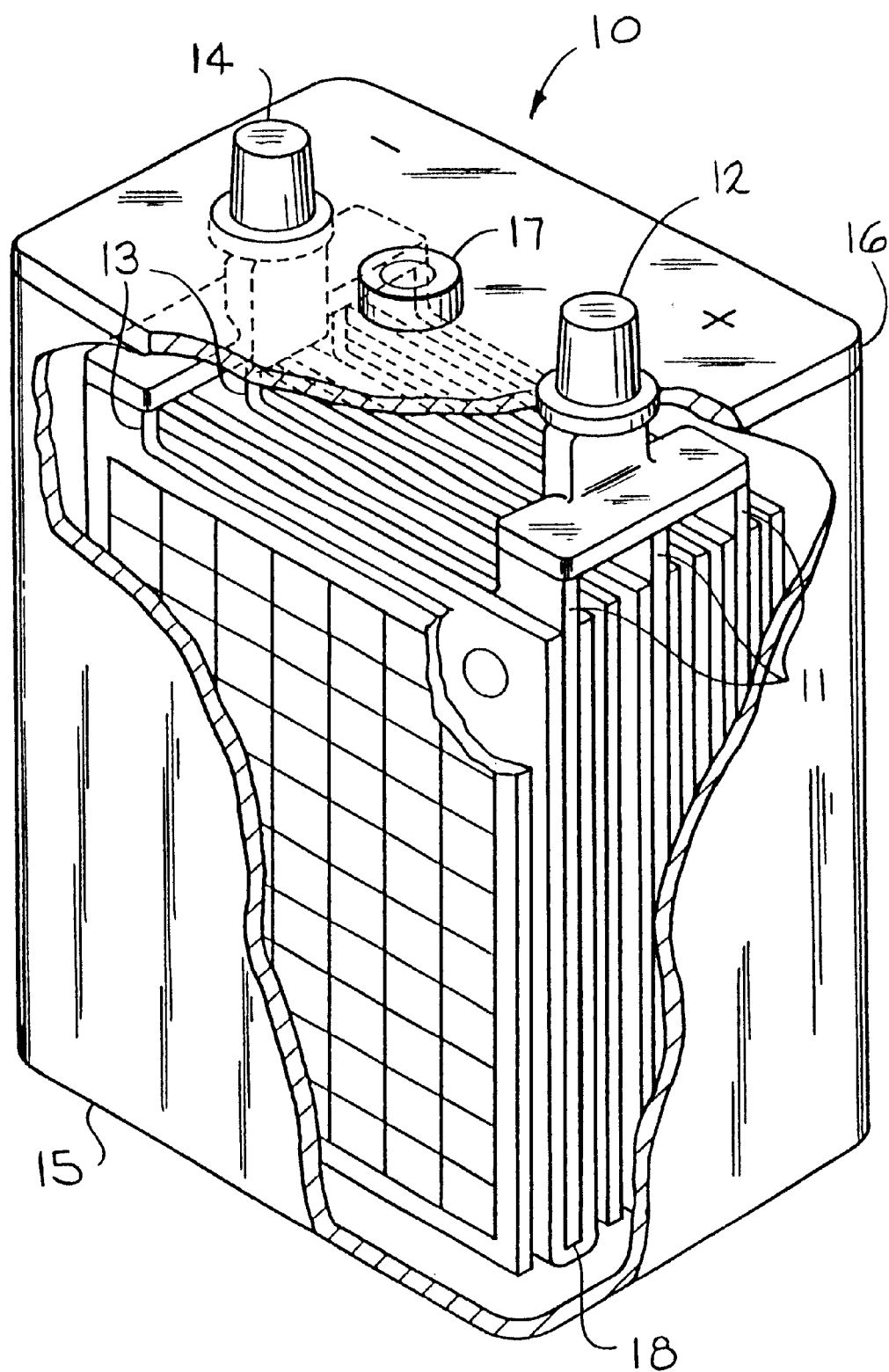
FIG. 1 is a perspective view with parts broken away to show details of construction of a VRLA battery according to the invention.

A single cell battery according to the invention with a total of 9 plates is indicated generally at 10 in FIG. 1. Except for the identity of the separator material therein, the battery 10 is conventional; the separator can be used in other otherwise conventional batteries. The battery 10 comprises four positive plates 11 which are electrically connected to a positive terminal 12 and five negative plates 13 electrically connected to a negative terminal 14. The plates 11 and 13 are housed within a battery case 15 which is covered by a top 16. There is an opening through a boss 17 on the top 16 of the battery. Separators 18 are composed of sheets of separator material wrapped around the bottom and both major faces of each positive plate 11.

In a specific example, five, 8A-U1 batteries similar to the batteries 10, but having four negative and four positive plates were produced from separator material composed of glass fibers collected, as the fibers were formed, into a mat weighing about 310 g.m$^{-2}$; the fibers had an average diameter of substantially 0.8 µm. A control battery was also produced using a separator that is commercially available under the designation BG 30005: this material, which is made by the wet paper making process, weighs 300+/-15 g.m$^{-2}$. This control was made so that assembly and properties of the five 8A-U1 batteries could be compared with the assembly and properties of a control made with separator having the same general target grammage. It was noted that the drylaid separator used to produce the five batteries had a substantially greater thickness and resiliency that the control separator: this confirmed laboratory findings concerning drylaid separator. An assembly of three pairs of positive and negative plates with the drylaid separator had approximately the same thickness as an assembly of five pairs of positive and negative plates with the BG 30005 separator, indicating that drylaid separator for a given battery should have about three-fifths the grammage of conventional wetlaid separator for that battery.

Difficulties were encountered in the assembly of the batteries from the drylaid separator because of the high resiliency of the airlaid separator. These difficulties arose when attempts were made to cast straps on the assemblies of plates with separators and in inserting assemblies of plates and separators into batteries. The cases of batteries that were made were deformed by forces exerted by the separator. One assembly of plates and drylaid separator was compressed in a press with one ton of force for fifteen minutes; since the plate surfaces were 4.85 inches by 4.85 inches, this amounted to an applied force of about 87 psi. This assembly was then inserted into a battery case, which it did not deform.

Figure 5:
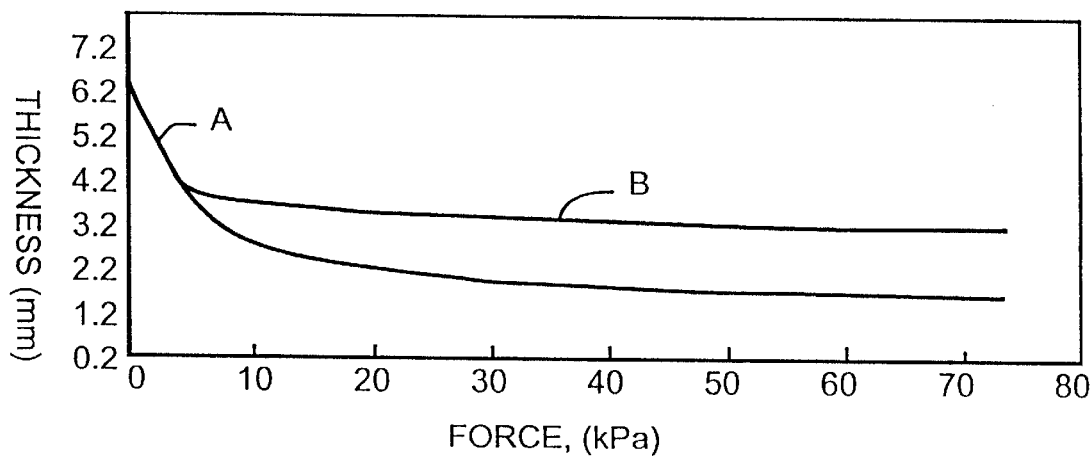
FIGS. 5 and 7 are plots of thickness in mm of separator materials that can be used in batteries according to the invention, when compressed (the compression curve), vs. force in kPa applied to compress the separator to that thickness and of rebound thickness in mm (the rebound curve) vs. force applied before rebound thickness was determined.
Figure 6:
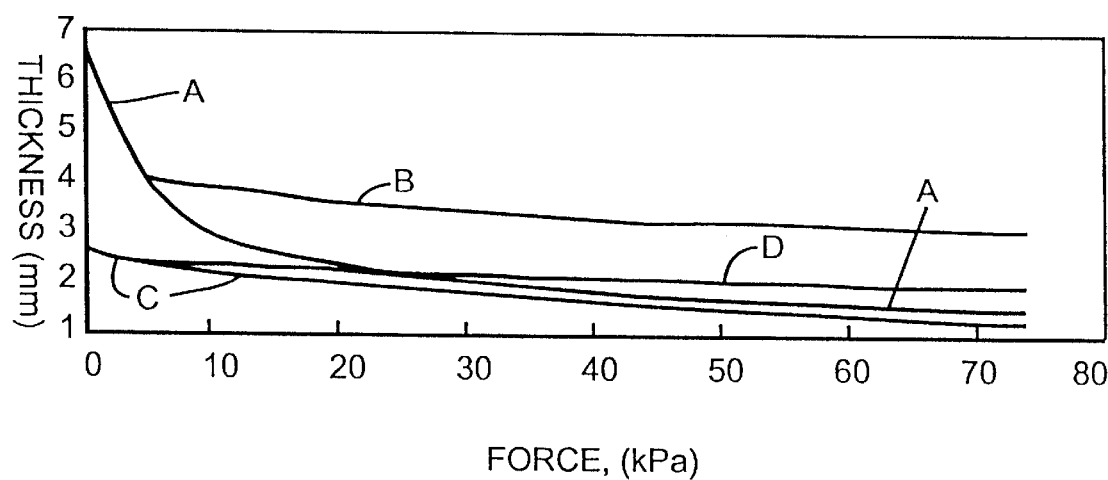
FIGS. 6 and 8 are plots of the data represented in FIGS. 5 and 7 and, in addition, plots of thickness of a wet-laid glass fiber separator in mm when compressed vs. force in kPa applied to compress the separator to that thickness and of rebound thickness in mm vs. force applied before rebound thickness was determined for commercial separator materials that have been used in batteries.

In another example, batteries similar to the batteries 10, but having 4 positive plates and 4 negative plates were assembled using sheets cut from the rest of the separator, which had a grammage of about 250 g.cm$^{-2}$. Separators were placed between adjacent plates, but were not used between the case and the outer plates. The batteries were found to have cycling characteristics substantially equivalent to those of the control battery. In another specific example, a glass fiber mat was produced which weighed 1000 g.m$^{-2}$ and was composed of fibers having an average diameter of substantially 0.8 µm; a layer which weighed 318 g.m$^{-2}$, which was separated from this mat, is the separator in the battery described above in this paragraph. The separator was subjected to testing to determine "Compression" and "rebound". Compression thicknesses were determined by the method described in U.S. Pat. No. 5,336,275 under various applied loads, and after the excess of each applied load above 3.79 kPa was released; the former measurements are he "Compression" thicknesses while the later are "rebound" thicknesses. The average results are presented graphically in FIG. 5, which is a plot of the thicknesses of the separator 18 in mm (designated A) at various applied loads in kPa and of the thicknesses in mm (designated B) after the excess above 3.79 kPa of each applied load was released. Each data point for one of the curves of FIG. 5 is indicated by "+" (this is the curve for "rebound" thickness) and each data point for the other curve is indicated by a dot (this is the curve for "Compression" thicknesses). The data plotted in FIG. 5 indicate that the separator is an outstanding material. Compression and rebound thicknesses were determined for a commercially available separator material that is produced by a wet process using paper making equipment. The material tested is available under the trade designation HOVOSORB BG 30005, grammage 318 g.m$^{-2}$. The average results of this testing are presented graphically in FIG. 6, which is a plot similar to FIG. 5, showing the data plotted in FIG. 5 and the Compression thicknesses (designated C) of the HOVOSORB BG30005 separator in mm and the Rebound thicknesses in mm (designated D) against the applied load in kPa.

Figure 7:
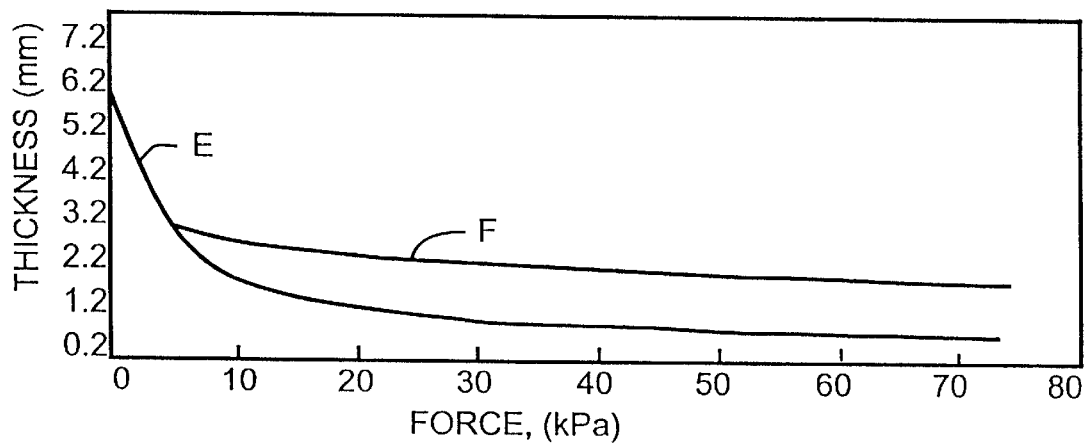
Figure 8:
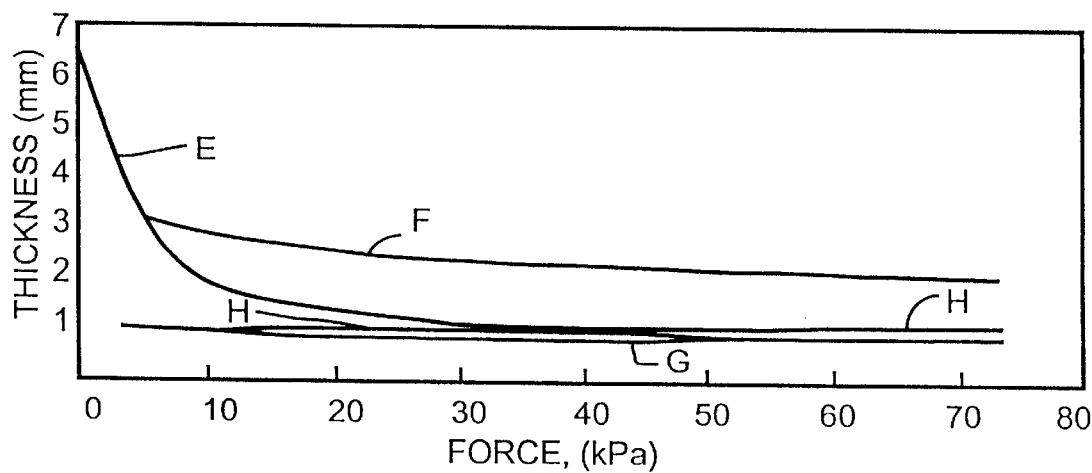

In yet another specific example, a glass fiber mat weighing 1000 g.m$^{-2}$ was produced. The mat was composed of fibers having an average diameter of substantially 0.8 $\mu$m; a layer which weighed 130 g.m$^{-2}$ was separated from this mat and used as the separator in the battery 10. The separator was subjected to "Compression" and "rebound" testing. The average results are presented graphically in FIG. 7, which is a plot of the Compression thicknesses of the separator in mm (designated E) and of the rebound thicknesses in mm (designated F) against the applied load in kPa. The data points for one of the curves of FIG. 7 are shown by plus marks (these are the data points for the "Rebound" curve), while those for the other curve are indicated by dots (these are for the "compression" curve). The data plotted in FIG. 7 indicate that the separator is an outstanding material. Compression and rebound thicknesses were determined for a another separator material that is commercially available, this one under the trade designation BGC 14065, grammage 130 g.m$^{-2}$. The average results of the BGC 14065 material are also presented graphically in FIG. 9, which includes a plot of the compression thicknesses of the BGC 14065 separator in mm (designated G) and of the rebound thicknesses in mm (designated H) against the applied load in kPa. The data points for one of the BGC 14065 curves are shown by open circles (these are the data points for the "Rebound" curve), while an * indicates each data point for the other BGC14065 (these are the "compression" curves).

In still another specific example, glass fiber mat weighing 1000 g.m$^{-2}$ was used to produce separator material. The mat was composed of several layers of intermeshed fibers, one of which was collected on each rotation of a collecting drum. The fibers of the mat had an average diameter of substantially 0.8 $\mu$m; each layer weighed substantially 130 g.m$^{-2}$. Rectangles of the size desired for separators were selected by visual examination from the layers of the mat for minimum variations in thickness and grammage, and were cut from the mat for use as battery separator.

Compression and rebound testing of other separator materials composed of the 608 MF mat which ranged in grammage from 130 to 1151 g.m$^{-2}$, indicated that they are all outstanding separator materials.

Figure 9:
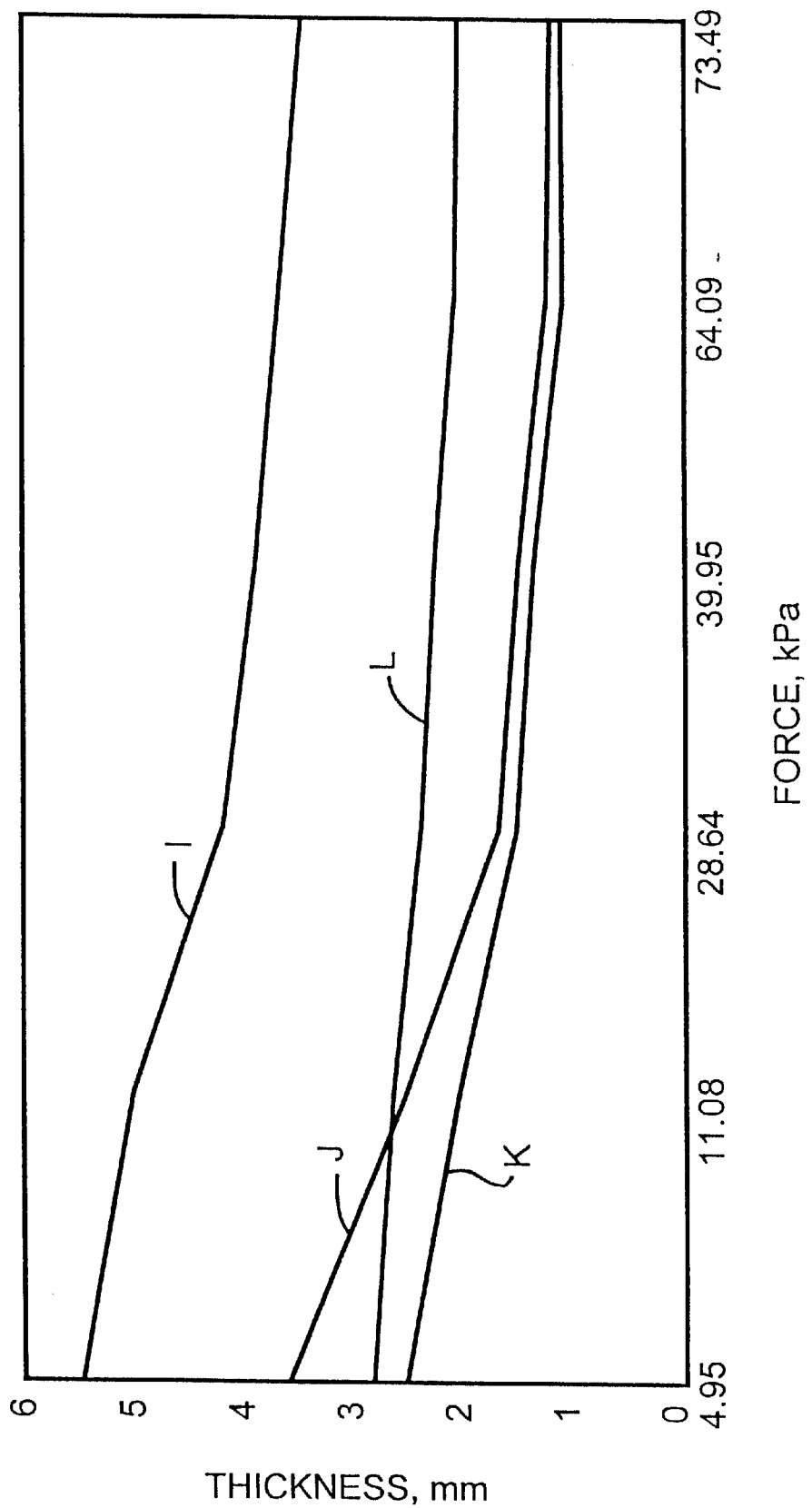
FIG. 9 is a plot of separator thickness in mm against compression force in kPa for each of two different materials under compression, and rebound thickness for each of the same two materials after they have recovered after being unloaded.

In another example, a glass fiber mat was produced which weighed 258 g.m$^{-2}$ and was composed of fibers having an average diameter of substantially 0.8 $\mu$m. This separator was subjected to "Compression" and "rebound" testing. The average results are presented graphically in FIG. 9, which is a plot of the Compression thicknesses of the separator in mm and of the rebound thicknesses in mm against the applied load in kPa. The data points for one of the curves of FIG. 9 (designated I) are the data points for the "Rebound" curve), while those for another curve (designated J are for the "compression" curve). Compression and rebound thicknesses were also determined for a wetlaid separator material, grammage 244 g.m$^{-2}$. The average results of the wetlaid separator material are also presented graphically in FIG. 9, showing the compression thicknesses of the wetlaid separator in mm (designated K) and the rebound thicknesses in mm (designated L) against the applied load in kPa.

It has been considered desirable for glass fiber separator material used in VRLA batteries to contain a substantial proportion of fine fibers, e.g., finer than about 5 $\mu$m. The separators, if +hey contain a sufficient proportion of fine fibers, are capable of holding enough of the relatively small amount of electrolyte that is used in such batteries to make contact with the plates, and to enable an electric current to flow through the separators. It is usually desirable that the separators also contain a substantial proportion of coarser fibers in order to reduce the cost per pound. The cost performance of a separator is as critical as improvement in the physical properties of the separator for this technology. The ability to manufacture a separator at reduced cost is the main focus of all separator manufacture and is a key part of most work done on separator material. The coarse fiber, in addition to helping to reduced the cost of the separator, also provides changes in separator physical properties that may improve the performance of the VRLA battery, depending on the design use of the battery. Increasing the fiber diameter (decreasing the surface area of the fiber blend) can increase the rate at which the battery manufacturer can fill the battery with electrolyte because the rate of wicking for the typical plate heights in most VRLA batteries will increase, as reported in a paper given by George C. Zguris at the Fifth International ILZRO Lead Acid Battery Seminar. This seminar was held Apr. 18, 1991 in Vienna, Virginia. Additional information can also be found in another paper authored by Zguris, Klauber and Lifshutz entitled "New Developments in Control of Valve-Regulated Battery Separators", which has also been presented. This higher rate of wicking is the effect of a higher distribution of larger pores caured by the larger fibers. The rate of wicking determines how quickly the sulfuric acid electrolyte fills, or drips into the battery. The larger pore structure also provides for easier fluid flow and release of the sulfuric acid electrolyte into or from the plates. The blending and layering of the fiber can be seen to be advantageous to a battery manufacturer because it makes possible greater efficiency in the filling of the batteries. The filling process for VRLA type batteries is much more complex than for what is described as a conventional flooded lead acid battery. One of the disadvantages faced by the manufacturer is that the VRLA battery is higher in cost compared to the flooded lead acid battery. Some of this disadvantage to the VRLA battery manufacturer is that it takes much longer to fill the VRLA battery than to fill conventional flooded batteries; also additional equipment such as vacuum fillers must be employed to get the acid into the separator and the plates. A separator that enables improvements in the filling process presents an advantage to the manufacturer of VRLA batteries. In addition to the time required to fill the battery it is important that when the battery is filled it has the correct amount of electrolyte for a conventional 100% glass separator material to allow for sufficient recombination to occur. A separator that is 100% saturated and does not follow the disclosures of U.S. Pat. No. 4,908,282, Badger, will not allow for recombination to occur because the oxygen that is generated at the positive plate can not move to the negative plate. Most VRLA batteries will therefore be made with only 90–95% of the separator pore spaces filled with the electrolyte. As the amount of electrolyte is decreased, the recombination reaction increases. Therefore, providing a separator that has higher porosity between the plates will provide an enhancement to the battery, since additional acid can be added with the same level of recombination. Since the amount of sulfuric acid in the battery relates to the capacity of the battery, such a separator provides for a battery with improved low rate capacity. The coarse fiber is also a disadvantage in the battery because, as the fiber surface area is decreased, the cycle performance of the battery also decreases. This was disclosed in U.S. Pat. No. 4,336,314, Yonnezu. The impact of the fine fiber to coarse fiber ratio and how this impacts cycle life has also been disclosed in press releases and papers presented and released by the Advance Lead Acid Battery Consortium (ALABC). Therefore, to enhance a separator it is important that one consider the combined impact of having a suitable blend or blends of fiber diameters to provide a battery having a suitable fill rate and a suitable cycle performance. With conventional wet laid microglass separators these two important properties are opposite in nature; if a change improves the filling rate, the cycle performance of the battery is adversely affected. It is the goal of any separator improvement to increase the acid fill rate and yet provide for equal or improved cycle life.

Drylaid mat produced as described above has been examined under a scanning electron microscope. It was observed that the material which was collected on a drum while that drum rotated more than one revolution was composed of a plurality of discrete layers, one for each rotation of the drum during the collection process, and that there was a fiber diameter gradient within each of the discrete layers, the fibers of the smallest diameter being concentrated adjacent one major surface of each layer, and the fibers of the largest diameter being concentrated adjacent the other major surface. The tests described above demonstrate that this separator material has improved resilience, by comparison with wetlaid separator. An experiment that has been performed with plural sheets of wetlaid glass fiber separator demonstrated that the separator composed of discrete layers also has improved shock resistance by comparison with conventional wetlaid separator. The experiment involuted compressing a stack of wetlaid separator sheets using a compression fixture on a conventional tensile testing machine. Scanning electron microscope examination of the compressed material revealed that substantially all of the deformation occurred in one of the outside sheets of the stack. This indicates that the layered separator material would also have improved shock resistance by comparison with material which is substantially uniform throughout its thickness. It will be appreciated that the separator material can also be produced by a wet papermaking process where similar layering occurs, for example, by casting a plurality of slurries of glass or other fibers, the first on the screen of paper making apparatus, and the second and subsequent ones on the previously cast fibers, or by assembling a plurality of thin sheets of glass or other fibers made by a conventional wet process to produce a composite separator having the desired thickness and grammage, It will also be appreciated that dry-laid webs of fibers made by the process described in Chapter 7: Dry-Laid Systems by Albin F. Turbak, "Nonwovens. Theory, Process, Performance, and Testing" can also be used as separator material in batteries according to the present invention. This process involves carding bundled fibers that can be purchased from manufacturers, and suspending the carded fibers in air or another gas inside a hood, and using vacuum to draw the suspended fibers onto a foraminous conveyor so that they form a web of a desired thickness.

Figure 2:
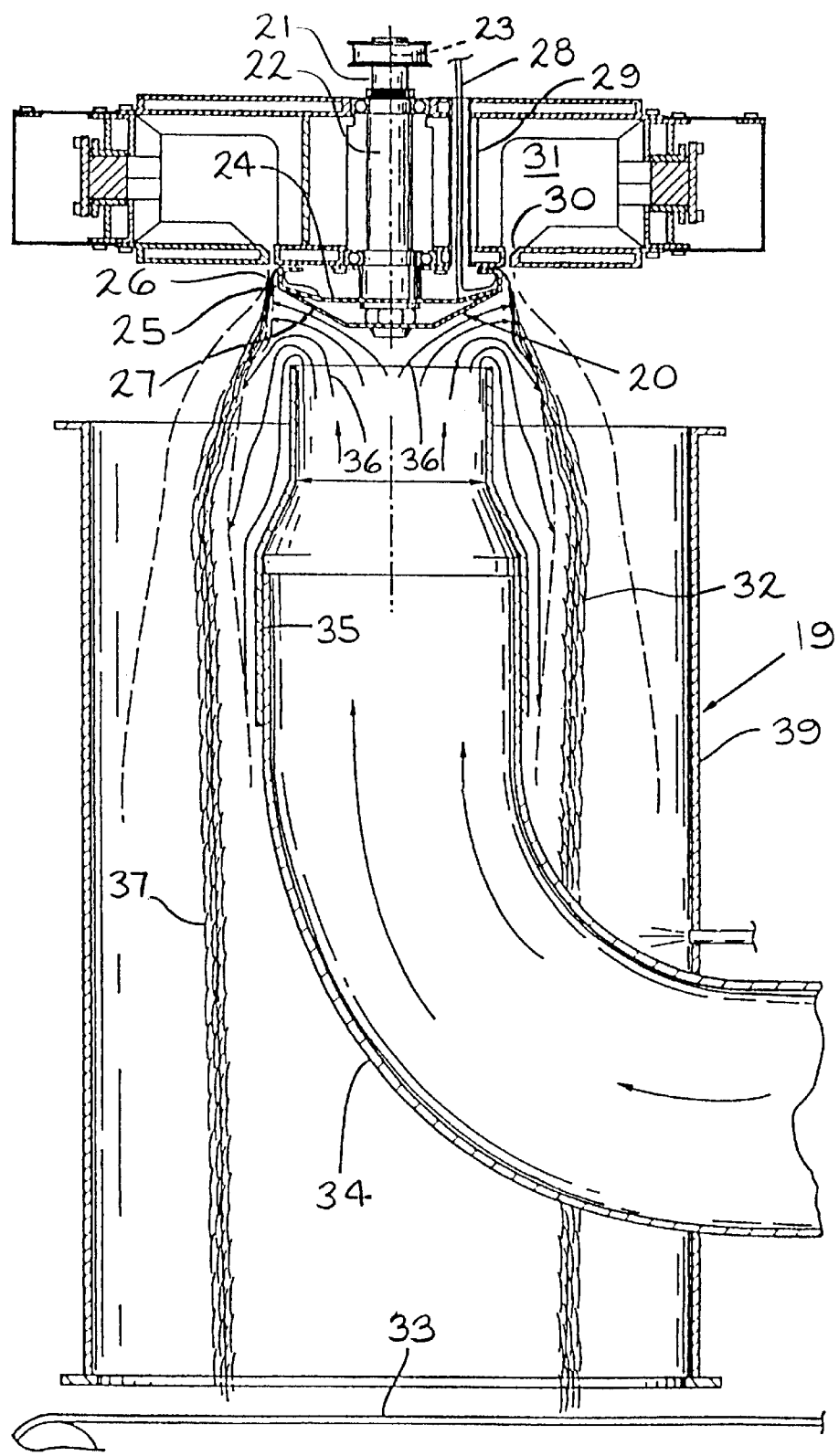

FIGS. 2 and 2a show apparatus which can he used to produce battery separator material composed of first glass fibers having a first average fiber diameter and second glass fibers having a second average fiber diameter. The apparatus has two different fiberizers, one of which is indicated generally at 19, and the other of which if indicated generally at 19'. The two fiberizers 19 and 19' are identical, each includes a spinner assembly 20, 20' carried by a rotatable spindle 21, 21' which can be rotated at high speed about its longitudinal axis 22, 22' by a motor (not illustrated) which drives a belt-driven pulley 23, 23' that is keyed to the tipper end of the spindle 21,21'.

Each of the spinner assemblies 20. 20' includes an internal bowl 24, 24' which rotates with the spindle 21, 21'. Each bowl 24, 24' has a peripheral wall 25, 25' through which there are several small diameter openings 26, 26'. Each spinner assembly 20, 20'; also has an insulating heat shield 27, 27' which minimizes heat loss from the bowl 24, 24'.

As each spinner assembly 20 20' is rotated, molten glass 28, 28' flows from a melting tank (not illustrated) through a tube 29, 29' into one of the bowls 24, 24' from which centrifugal force causes streams of the glass to flow through the openings 26, 26'. An annular nozzle 30, 30' surrounds each of the spinner assemblies 20, 20'. Combustion of a fuel gas in a chamber 31, 31' forces a jet of heated gas to flow downwardly through the nozzles 30, 30'.

The gas jets flowing from the nozzles 30, 30' attenuate streams of molten glass which flow through the openings 26, 26' into fine fibers 32, 32' and direct them downwardly onto a conveyor 33, 33' where they collect as a mat.

Each fiberizer 19 and 19' also includes a riser tube 34, 34' which is connected to a source for compressed air (not illustrated) and to an end tube 35, 35' which extends vertically upwardly, and terminates just below the heat shields 27, 27'. As is indicated by arrows 36, 36', air flows upwardly through the riser tubes 34, 34' and the end tubes 35, 35' until it is deflected outwardly by the spinner assembly against the interior of a veil 37. 37' of fibers inside housings 39 and 39'.

The fiberizers 19 and 19' are disclosed in U.S. Pat. No. 5,076,826, which explains that the upward flow of air indicated by the arrows 36, 36' prevents a low pressure zone beneath the spinner assemblies 20, 20', and, as a consequence, reduces the amount of remelt which forms in the fiber veils 37, 37'. The patent also discloses that the fiberizers, except for the parts thereof which cause the upward flow of air, were prior art. Glass fiber mats produced by this apparatus that have been marketed are not sufficiently uniform in thickness and in grammage for use of separator material.

The apparatus of FIGS. 2 and 2a can be operated to produce separator material for use in batteries according to the invention. For example, the fiberizers 19 and 19' can both be operated to produce fibers having an average diameter of 0.8 μm, in which case the speed of the conveyors 33 and 33' can be controlled so that a mat 38 having the desired grammage is accumulated on the conveyors before it is conveyed from within the housings 39 and 39' for delivery to an upwardly inclined conveyor 40 and collection on a take-up roll 41. Ultimately, the mat 38 can be slit to width and used, for example, as described in U.S. Pat. No. 5,344, 466 to produce batteries.

Alternatively, the fiberizer 19 can be operated to produce fibers having an average diameter of 0.8 μm, and the fiberizer 19' can be operated to produce fibers having a larger fiber diameter, say 1.5 μm, and the speed of the conveyors 33 and 33' can be controlled to provide mat having a desired grammage and a desired proportion of fibers of the two diameters. Since it is usually desirable that the finest fibers of a separator be adjacent the plates of a battery, two layers of the separator described in this paragraph can be placed on top of one another, with their coarse fiber sides adjacent one another, to provide a particularly advantageous separator material.

Another apparatus (not illustrated) that can also be used to produce separator material composed of two outer layers of fine fibers and a center layer of coarser fibers comprises the apparatus of FIGS. 2 and 2a plus a third fiberizer, identical to the fiberizers 19 and 19' which is positioned between the two so that it deposits fibers on a mat that has already been formed in the fiberizer 19 and the fiberizer 19' deposits fibers on the mat discharged by the third fiberizer. In this case, the fiberizers 19 and 19' are preferably operated to produce fine fibers, and the third fiberizer is operated to produce coarser fibers.

The length of microfibers produced in the apparatus of FIGS. 2 and 2a depends upon glass chemistry. Slight changes can be made to impact various properties of the glass. Since the glass is ultimately exposed to sulfuric acid the chemistry must be controlled to provide a low acid solubility. The acid solubility can be determined in various ways. In addition to the acid solubility the elements that are leached from the glass is also critical. As an example the amounts of iron, platimum, nickel and zinc leached from the separator is important Some examples of how chemistry influences the glass fiber process are as follows: the addition of zircon to E-glass raised its liquidus temperature; which is the highest temperature at which a glass, if held there sufficiently long, will develop crystals, thus increasing the risk that the glass will devitrify, either before or after forming. It will be appreciated that the presence of even submicroscopic crystals in a glass melt is disastrous for fiber manufacture, because such a crystal can interrupt the flow of glass which is necessary in producing fibers. In general, it is desirable for a glass to be fiberized to have a low liquidus temperature, and for the liquidius temperature to be substantially below the fibrising temperature so that the glass is stable during fiberizing (see, for example, *The Manufacturing Technology of Continuous Glass Fibres*, K.L. Loewenstein, 1993 Elsevier Sciene Publsihers). Small levels of fluoride assist in the melting of a glass, lowering the liquidus temperature and making fiber formation easier. In some cases, trace elements added to improve glass properties either in the melt or during fiber forming, must be balanced with the performance inside the battery. For example, a low level of iron is desirable in a glass fiber inside a battery, but the presence of iron oxide in the glass has a significant influence on the stability of the fiber forming operation because iron increases the rate of infrared emission. This influences the rate that heat is radiated from the glass fiber as it leaves the fiber forming operation. Increasing the sodium content of the glass, lowers the liquidius temperature, and increases the acid solubility, but does not have a negative influences in the battery; in fact positive results would be expected, because, for a VRLA battery, sodium sulfate is usually a desirable additive in the electrolyte.

Referring to FIG. 3, still another apparatus that can be used in producing separator material that can be used in a battery according to the invention is indicated generally at 42. The apparatus 42 comprises a fiber collection zone 43 in which primary filaments 44 drawn by pull rolls 45 from a fiber forming bushing 46 in a glass melting tank 47 pass over a filament support 48 and into a blast of hot gases from a high pressure hot gas nozzle 49. The blast of hot gas softens the filaments, attenuates them into fine fibers 50, and projects them to the right inside the collection zone 43. As is indicated by arrows 51, atmospheric air can enter the region where the fibers 50 are projected. A glass fiber mat 52, which can be one discharged from the fiberizer 19 enters the collection zone 43 on a conveyor 53, which passes over a suction box 54, holding the mat 52 in contact with the conveyor 53, and drawing fibers 50 to the bottom of the collecting zone 43 and onto the mat 52 and a mat 55 which forms inside the collection zone as fibers 50 are deposited, first, onto the mat 52, and then onto fibers 50 that have previously been so deposited.

The mat 55 can be conveyed into the fiberizer 19' for augmentation, or it can be slit, stacked, and used as previously described to produce a battery according to the invention, or it can be wound on a roll for subsequent processing.

Figure 4:
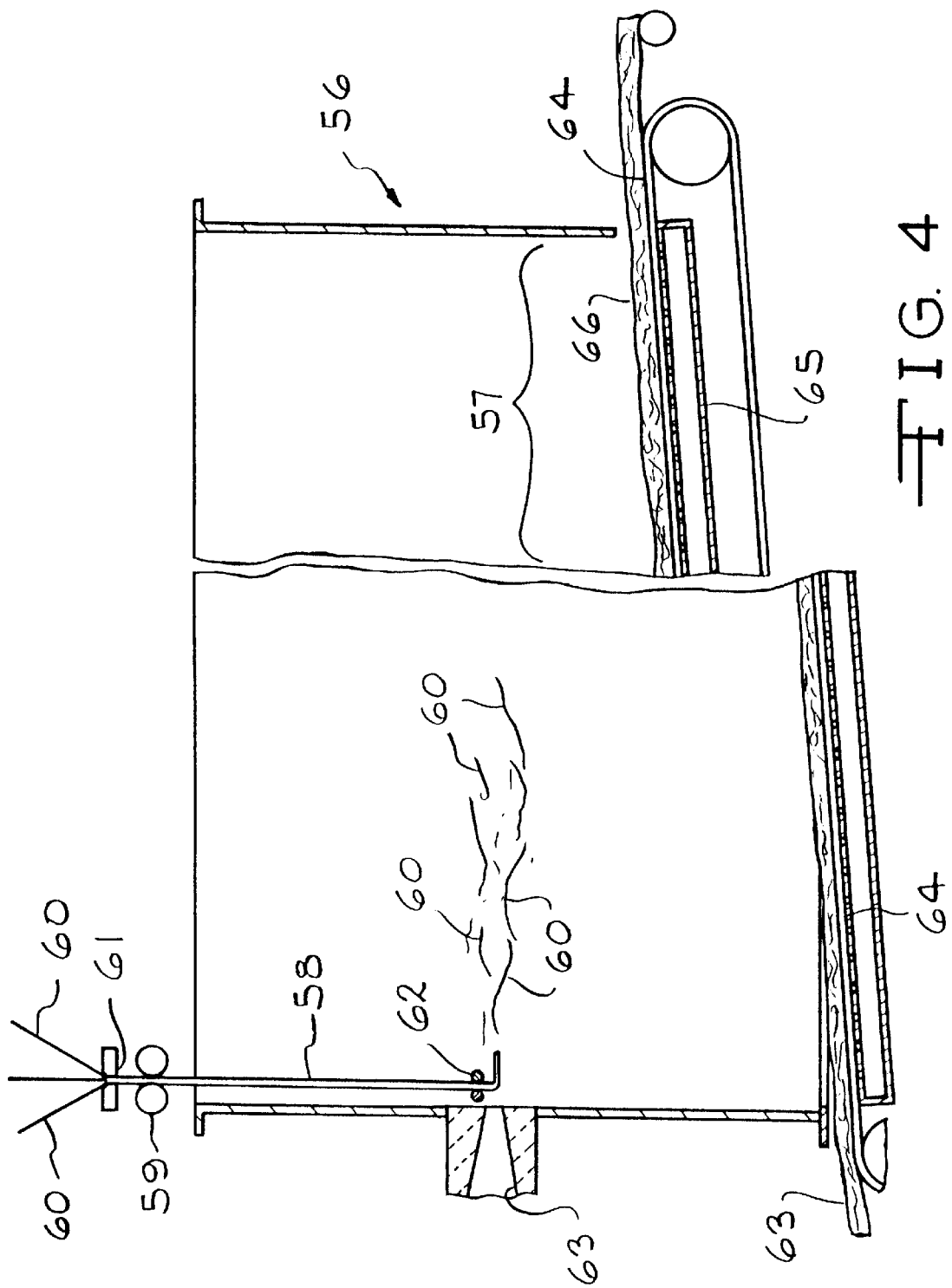
FIG. 4 is a schematic representation similar to FIG. 3 of still another apparatus which can be used with that of FIG. 2 for producing a glass fiber mat that can be used as collected from the fiber forming process to produce a battery according to the invention.

Referring to FIG. 4, still another apparatus that can be used in producing separator material that can be used in a battery according to the invention is indicated generally at 56. The apparatus 56 comprises a fiber collection zone 57 in which a strand 58 of textile glass fibers is drawn by pull rolls 59 to pull individual fibers 60 from a textile fiber bushing (not illustrated) in a glass melting tank (not illustrated), through a gathering shoe 61 and to second pull rolls 62 by which it is directed into a blast of gases from a high pressure gas nozzle 63. The blast of gas breaks up the strand 58, and projects the fibers 60 to the right inside the collection zone 57. A glass fiber mat 64, which can be one discharged from the fiberizer 19, enters the collection zone 57 on a conveyor 65, which passes over a suction box 66, holding the mat 64 in contact with the conveyor 65, and drawing fibers 60 to the bottom of the collecting zone 57 and onto the mat 64 and a mat 67 which forms inside the collection zone as fibers 60 are deposited, first, onto the mat 64, and then onto fibers 60 that have previously been so deposited.

The mat 67 can be conveyed into the fiberizer 19' for augmentation, or it can be slit, stacked, and used as previously described to produce a battery according to the invention, or it can be wound on a roll for subsequent processing.

The apparatus of FIGS. 2 and 2a can also be used to produce a multilayer separator material, e.g., by operating the fiberizing apparatus 19 of FIG. 2 to deposit a mat composed of a thin layer of fine fibers on the conveyor 33, advancing this thin layer of mat into the fiberizing apparatus of FIG. 2a, and depositing additional fibers and a siliciferous material, e.g., silica, sand, clay, talc, fumed silica, precipitated silica, sericite, colloidal silicia, silicate of soda, silicate, silicon alkoxide, vermiculite, volcanic ash, wollastonite, zircon, forsterite, diamtomaceous earth, cutlet, cristobalite, glass flakes, or aluminium silicate on top of the thin layer of mat. The fibers can be deposited in the apparatus of FIG. 2a as previously described, and an aqueous slurry of the silica or the like can be fed at a suitable rate to a rotating dish 67 With veins 68 so that the slurry is thrown outwardly by centrifugal force in the dish 67 and then projected radially outwardly by the veins 68 into the veil 37. Any of the slurry that falls onto the thin layer of the mat on the conveyor 33' is merely collected there, becoming a part of the separator material just like that which impinges on the veil 37. The procedure just described can also be used to deposit both silica and a sulfate salt in the apparatus of FIG. 2a. In that case, the FIG. 2 apparatus can be operated to deposit a mat composed of a thin layer of fine fibers on the conveyor 33, advancing this thin layer of mat into the fiberizing apparatus of FIG. 2a, and depositing additional fibers and an aqueous solution of colloid silica particles or of colloidal silica particles and a sulfate salt onto the single layer or multilayer separator. The fibers can be deposited in the apparatus of FIG. 2a as previously described, and an aqueous slurry of the silica or of the silica and a sulfate salt can be fed at a suitable rate to the rotating dish 67 with veins 68 so that the slurry is thrown outwardly by centrifugal force in the dish 67 and then projected radially outwardly by the veins 68 into the veil 37. Any of the slurry that falls onto the thin layer of the mat on the conveyor 33' is merely collected there, becoming a part of the separator material just like that which impinges on the veil 37. A spray unit, curtain coater, size press unit or other suitable delivery device, can also apply the solution. The mat discharged from the fiberizer 19' is then compressed and the excess fluid is removed by a suitable drying device. while the separator is held in its compressed condition, so that the dried separator is pre-compressed in the sense that the separator, when in a battery, will expand upon the addition of sulfuric acid to the battery. The separator just described is an improvement over that of U.S. Pat. No. 5,091,275, (Brecht et al.) in that the process of papermaking is eliminated so that the fibers therein are longer. with the result that the separator has improved compressibility.

Sulfate salts and colloidal silica introduced into the separator as described in the preceding paragraph can cause the separator to become very stiff and rigid. Separators which contain amounts of colloidal silica and sulfate salts sufficient to cause this rigid condition are difficult to dry with conventional dryers usually used to dry wet process separator. It is also part of the present invention that the salts can bred kept towards the middle of the sheet so that the separator has less rigid outer layers, with the result that initial contact between separator and battery, plate is improved. It is also to be understood that organic binders that would release the fibers within the cell once the sulfuric acid electrolyte is added can be used. The soluble binder can be a starch, a gum, sodium carboxymethyl cellulose, Hydroxyethyl cellulose, or any of various wet strength additives. Since the separator of the instant invention has much more resiliency, and for a given grammage would have a greater thickness, a pre-compressed material could be used as a separator to provide the same grammage-thickness relationship as a separator made by a wet laid process, so that an increased wet compresive force can be maintained inside the battery. It is well known that the force with which a typical lass separator resists compression is less when the separator is saturated with electrolyte to levels found inside a lead acid battery than when the separator is dry. The change in this force call be a 20–60 percent decrease from that when the separator is dry. A process that decreases this difference will enhance the battery. In many cases, the dry compressive force that must be applied for a separator to have sufficient resilience after the acid is added exceeds the force that can be withstood by the battery case; this makes it impossible for a manufacturer to assemble the battery without defects. Such defects could be poor sealing between the case and the cover, intercell partition leaks, or poor cast on strap welds, to name a few. Thus, a separator with a decreased dry-wet force ratio or a separator that provides a greater thickness in the wet condition offers a substanstial advantage.

The apparatus of FIGS. 2 and 2a can also be used to produce a single layer or multilayer separator material composed of polyolefin fibers, usually polyethylene or polypropylene. For example, streams 28, 28' of a molten polyolefin can flow from a melting tank (not illustrated) through the tubes 29, 29' into one of the bowls 24, 24' from which centrifugal force causes streams of the polyolefin to flow through the openings 26, 26' so that heated gas jets flowing through the nozzles 30, 30' attenuate the polyolefin streams into fine fibers 32, 32' and direct them downwardly onto the conveyors 33, 33'. Air flowing upwardly through the riser tubes 34, 34' and the end tubes 35, 35' is deflected outwardly by the spinner assembly against the interior of a veil 37, 37' of polyolefin fibers inside the housings 39, 39'.

The fiberizing apparatus 19 of FIG. 2 can be operated to deposit a mat composed of a thin layer of fine polyolefin fibers on the conveyor 33, and this thin layer of mat can be advanced into the fiberizing apparatus of FIG. 2a where additional polyolefin fibers can be deposited onto the single layer or multiple layer separator. If desired, an aqueous solution of colloidal silica particles or of colloidal silica particles and sulfate salt can also be introduced in the apparatus of FIG. 2a. The polyolefin fibers can be deposited in the apparatus of FIG. 2a as previously described. The mat discharged from the fiberizer 19' is then compressed and the excess fluid, if any, is removed by a suitable drying device, while holding the thickness of the separator in its compressed condition, so that the dried separator is pre-compressed in the sense that the separator, when in a battery, will expand upon the addition of sulfuric acid to the battery.

Fiberizing apparatus other than that of FIGS. 2 and 2a can also be used to produce separator according to the invention, so long as care is taken to collect the fibers produced so that the separator is sufficiently uniform in thickness and in grammage. For example, the apparatus of FIGS. 3, 4 and 10 can be so used, as can the modifications of FIGS. 2b and 2c, and other "flame blown" and other "rotary" processes, e.g., those which do not include the tubes 39 and 39' of FIGS. 2 and 2a. It will be appreciated, however, that fiberizing apparatus which includes the tubes 39, 39' is highly desirable because of the ease with which additives such as silica can be mixed uniformly with the fibers.

Similarly, the apparatus of FIGS. 2 and 2a can be used to produce still another multilayer separator material, e.g., by operating the fiberizing apparatus 19 of FIG. 2 to deposit a mat composed of fine fibers on the conveyor 33, advancing this layer of mat into the fiberizing apparatus of FIG. 2a and depositing additional fibers and a siliciferous material of extremely fine particle size, which can be added as a concentrated siliciferous slurry or as a dry powder. Such siliciferous powders of specially prepared silicon dioxide are also known as fumed silicia or $SiO_2$ and are especially beneficial. Colloidal silica, which is commercially available from duPont, could also be used. The presence of finely divided silica in the separator enables improved retention of the acid. When the silica content is sufficiently high that the separator causes the acid to gel, this result is achieved without the difficult step of adding the fumed silica to the sulfuric acid electrolyte in the battery. This gel usually forms when the separator contains at least 5–6% of the fumed silica, based upon the weight of the electroylte ultimately added to the battery.

The addition of fumed silica to a battery to which the electrolyte has already been charged requires the acid to be chilled, high energy intensive agitation, or both to prevent premature gelling of the electrolyte before the addition of the silica is complete. The instant invention provides a dry, glass-silica separator; the silica in the separator causes the gelling of the electrolyte, so that the silica does not have to be added into the sulfuric acid, with the result that charging of the electrolyte is easier, and the possibility that the electrolyte will jell prematurely is eliminated. Separators containing a gelled electrolyte are usually composed of microporous polyethlyene or PVC. The fumed silica in such a separator should usually constitute from 30–50% of the total weight of the separator. It has been found by scanning electron microscope examination that the silica is far from being uniformly distributed in separators containing silica that have heretofore been known. The silica is much more uniformly distributed in separators according to the invention which contain silica.

It will be appreciated that, for some applications, a separator containing a given percentage of a fine silica adjacent one of the major surfaces will be desirable while a different percentage of a fine silica will be desirable adjacent the opposed major surface. For example, silica can be introduced in the apparatus of FIG. 2a to control pore structure of the separator to provide a match to the pore structure of one of the facing plates of a battery in which the separator is to be used, while the apparatus of FIG. 2 is operated to produce material which contains no silica. Similarly, separator can be produced by depositing only fibers from the apparatus of FIG. 2, depositing fibers and a given proportion of silica from a first unit of the apparatus of FIG. 2a, and then depositing fibers and a different proportion of silica from a second unit of the apparatus of FIG. 2a.

The apparatus of FIGS. 2 and 2a can also be used to produce still another multilayer separator material, e.g., by operating the fiberizing apparatus 19 of FIG. 2 to deposit a mat composed of fine fibers on the conveyor 33, advancing this layer of mat into the fiberizing apparatus of FIG. 2a and depositing additional fibers and a concentrated slurry of extremely fine cellulose or other fibrils, e.g., acrylic, on top of the layer of mat. The fibers can be deposited in the apparatus of FIG. 2a as previously described, and an aqueous slurry of the cellulose fibrils can be fed at a suitable rate to the rotating dish 67 so that the slurry is thrown outwardly by centrifugal force in the dish 67 and then projected radially outwardly by the veins 68 into the veil 37. Any of the slurry that falls onto the thin layer of the mat on the conveyor 33' is merely collected there, becoming a part of the separator material just like that which impinges on the veil 37. There can also be a dish 67 (not illustrated) in the fiberizer 19 of FIG. 2, which can be operated as just described to introduce cellulose fibrils into the fibers formed in the fiberizer 19.

Figure 10:
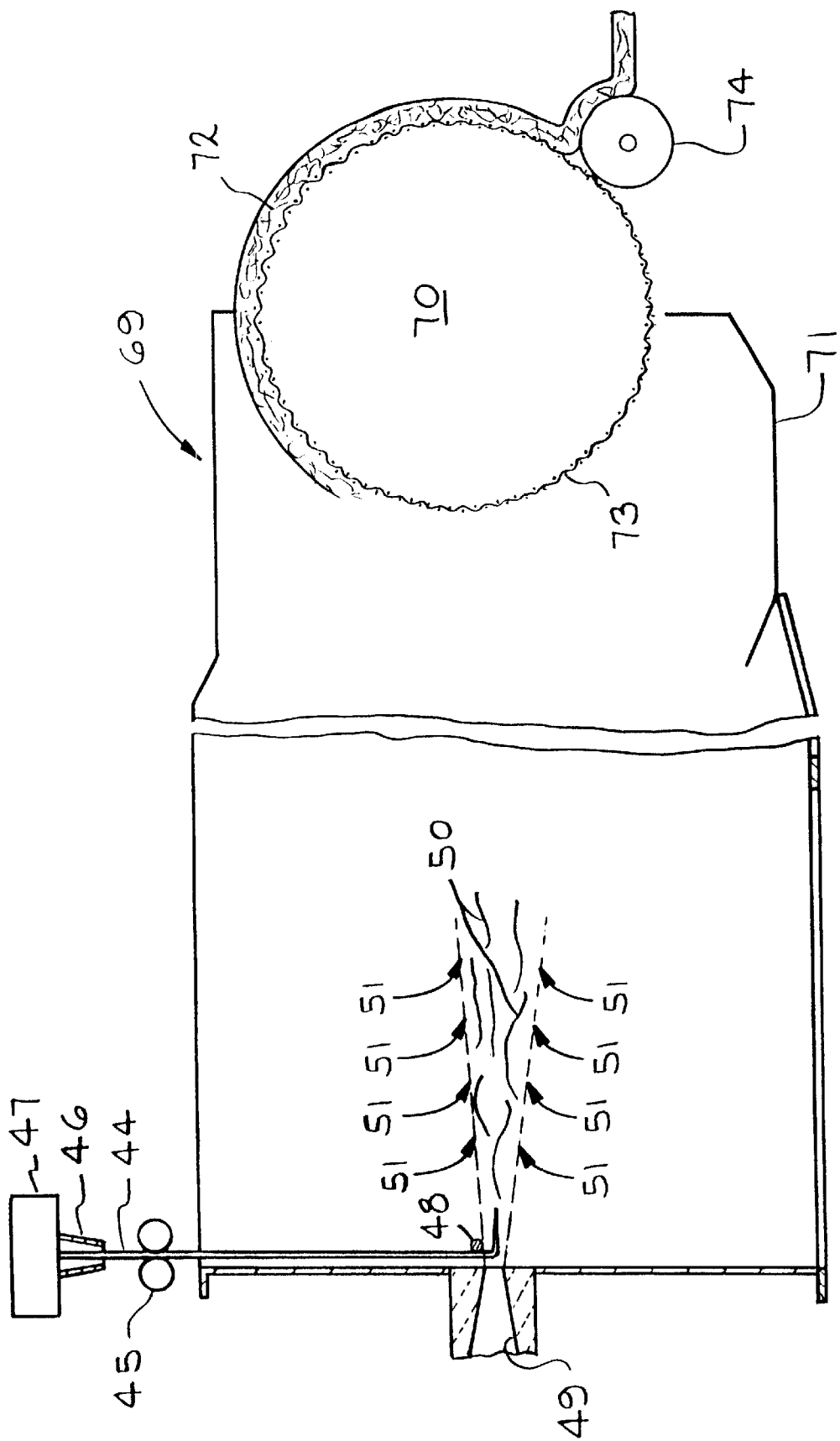
FIG. 10 is a vertical sectional view which shows, schematically, apparatus similar to that of FIG. 3 for producing a glass fiber mat by what is called "the flame blown method"; the mat produced can be used as collected from the fiber forming process, i.e., without having been subjected to a wet paper making process, to produce a battery according to the invention.

Referring now to FIG. 10, apparatus indicated generally at 69 is similar to that of FIG. 3, except that a drum collector 70 has been substituted for the conveyor 53 of the FIG. 3 apparatus. The apparatus 69 comprises a fiber collection zone 71 in which primary filaments 44 drawn by pull rolls 45 from a fiber forming bushing 46 in a glass melting tank 47 pass over a filament support 48 and into a blast of hot gases from a high pressure hot gas nozzle 49. The blast of hot gas softens the filaments, attenuates them into fine fibers 50, and projects them to the right inside the collection zone 71. As is indicated by arrows 51, atmospheric air can enter the region where the fibers 50 are projected. A mat 72 which is collected on a foraminous surface 73 of the drum 70 is removed from the drum by a roll 74 from which it is delivered to a collection zone, not shown.

Figure 2B:
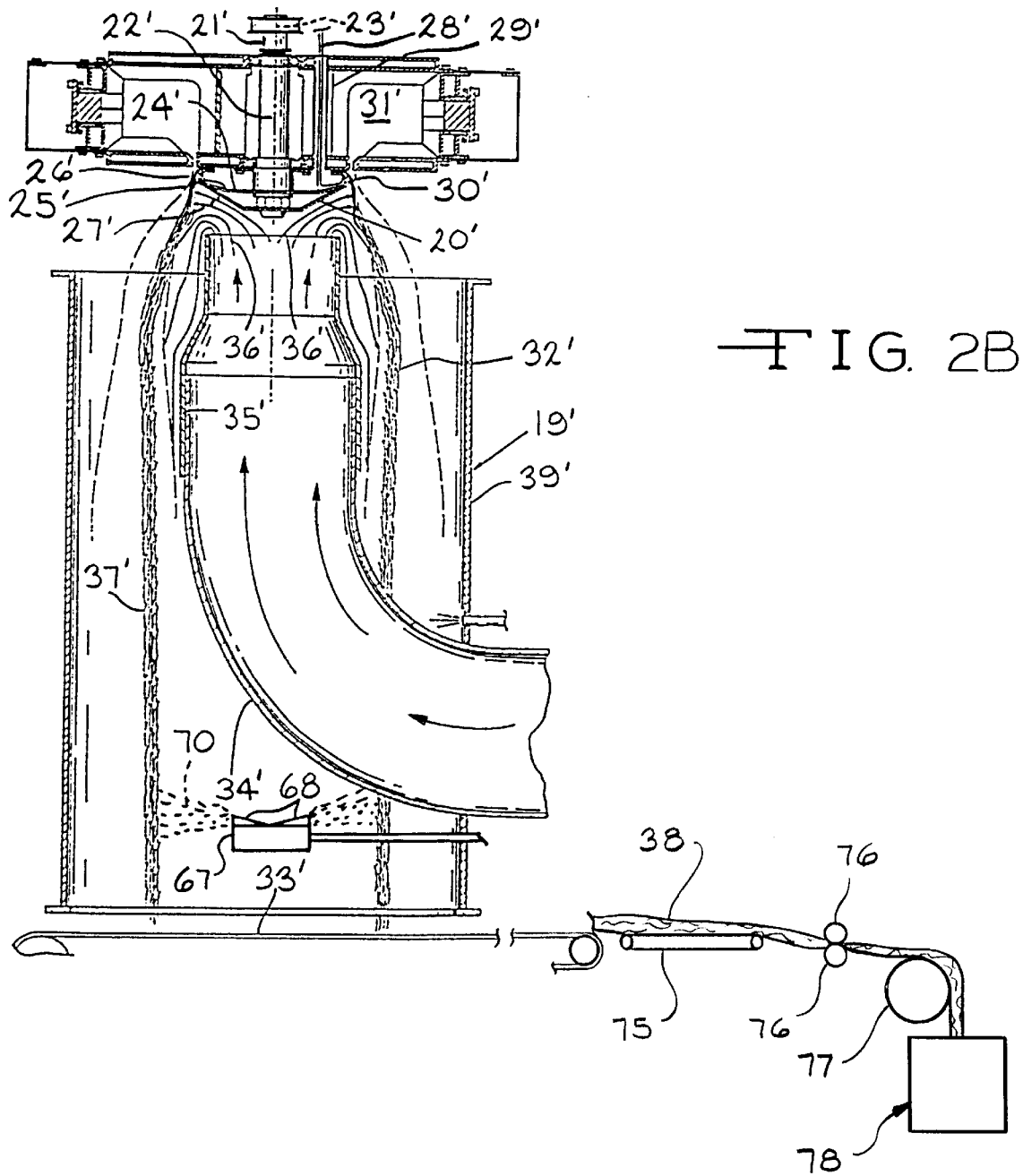
FIG. 2b is a view in vertical section which shows a different embodiment of the apparatus of FIG. 2a; in the embodiment of FIG. 2b, glass fiber mat produced by the rotary process is used directly as separator material in producing assemblies comprising positive and negative plates and separators for use in batteries.

A modification of the apparatus of FIG. 2a is shown in FIG. 2b, designated 19". Most of the components of the apparatus 19' of FIG. 2a are present in the apparatus 19" of FIG. 2b, and are designated by the same reference numerals. In the FIG. 2b apparatus, glass fiber mat 38 that has been collected on the conveyors 33 (FIG. 2) and 33' (FIG. 2b) is delivered to a conveyor 75, passes between compression rolls 76, over a roll 77, and is delivered to apparatus indicated generally at 78. The apparatus 78 trims the mat 38 to a desired width and produces a cell assembly from the trimmed separator and other components. The cell assembly is described in U.S. Pat. No. 5,344,466, and shown in FIG. 3 thereof, while the portion of the apparatus 78 which produces the cell assembly is described in the patent, and shown in FIG. 5 thereof. A flat pressing operation can be substituted for that performed by the compression rolls 76 in the apparatus of FIG. 2b, or the mat can be compressed by passing between parallel open belts. These pressing operation can also be carried out in an oven.

A modification of the apparatus of FIG. 2a is also shown in FIG. 2c, designated 19'". Most of the components of the apparatus 19' of FIG. 2a are present in the apparatus 19'" of FIG. 2c, and are designated by the same reference numerals. In the FIG. 2c apparatus, glass fiber mat 38 that has been collected on the conveyors 33 (FIG. 2) and 33' (FIG. 2c) is delivered to a conveyor 79, passes between compression rolls 80, and is collected on a roll 81. The rolls of separator material can be shipped or transported to a remo-te or nearby battery assembly operation. The mat can also be cut to size by suitable apparatus and stacked for shipment or transportation to a remote or nearby battery assembly operation It will be appreciated that the instant invention, as described above, may be subjected to various modifications without departing from the spirit of the invention disclosed and claimed herein. For example, separator according to the invention and comprised of a plurality of sheets or layers may be needled or sewn together to provide added physical integrity for the separator. Additionally or alternatively, layers of material can be cross-lapped. In addition, additives which do not affect the essential characteristics of the separator may be incorporated, and can be added, in the apparatus of FIGS. 2a, 2b and 2c by charging them to the dish 67, or can be introduced into the riser tubes 34, 34'. Other modifications and changes will be apparent to one skilled in the art, and can be made without departing from the spirit and scope of the invention as defined in the appended claims.

I claim:

1. In a storage battery comprising a plurality of lead plates in a closed case, a fibrous sheet plate separator between adjacent ones of said plates, and a body of a sulfuric acid electrolyte absorbed by each of said separators and maintained in contact with each of the adjacent ones of said plates, the improvement wherein said separator sheets consist essentially of intermeshed glass or organic fibers produced by suspending fibers in a gaseous or liquid medium, and collecting the suspended fibers on a foraminous material in at least four discrete layers, with the proviso that the mass of fibers has a BET surface area of from 0.2 to 5 $m^2$ pergram.

2. In a storage battery as claimed in claim 1, the improvement wherein the collected fibers are predominantly glass microfibers.

3. In a storage battery as claimed in claim 1, the improvement wherein the collected fibers are predominantly organic microfibers.

4. In a storage battery as claimed in claim 1, the improvement wherein an inorganic particulate material is suspended and collected with the fibers, and the inorganic particulate material constitutes from 5 to 90 percent of the total weight of the fibers and particulate material.

5. In a storage battery as claimed in claim 1, the improvement wherein the fibers are suspended in a liquid medium.

6. In a storage battery as claimed in claim 1, the improvement wherein the fibers are suspended in a gaseous medium.

7. In a storage battery as claimed in claim 1, the improvement wherein the suspended and collected fibers are predominantly glass microfibers and chopped glass strand fibers.

8. In a storage battery as claimed in claim 1, the improvement wherein the suspended and collected fibers are glass microfibers, chopped glass strand fibers or both and from 5 to 95 percent w/w organic fibers.

9. In a storage battery as claimed in claim 8, the improvement wherein the organic fibers are polyolefin fibers.

10. In a storage battery as claimed in claim 8, the improvement wherein the organic fibers are Sulfar fibers.

11. In a storage battery as claimed in claim 8, the improvement wherein the organic fibers are polyester fibers.

12. In a storage battery as claimed in claim 8, the improvement wherein the organic fibers are acrylic fibers.

13. In a storage battery as claimed in claim 8, the improvement wherein the organic fibers are cellulose fibers.

14. In a storage battery as claimed in claim 8, the improvement wherein at least some of the organic fibers are bi-component fibers.

15. In a storage battery as claimed in claim 14, the improvement wherein the bi-component fibers act as a binder for the separator to improve the toughness of the separator, the cycling characteristics of the battery, and the resistance of the battery to vibration.

16. In a storage battery as claimed in claim 15, the improvement wherein said operator, when in the wetted condition, has a mullen bursting strength which is higher than that of an otherwise identical, 100% microglass separator when in the dry, as received, condition.

17. In a storage battery as claimed in claim 15, the improvement wherein the maximum mullen bursting strength of the separator is at least twice that of an otherwise identical, 100% microglass separator.

18. In a storage battery as claimed in claim 8, the improvement wherein the suspended glass fibers are a mixture of microfibers and chopped glass strand fibers.

19. In a storage battery as claimed in claim 4, the improvement wherein the inorganic particulate material increases the BET surface area of the separator by at least 100 $m^2/g$ and improves the stratification of the battery during float or cycle applications.

20. In a storage battery as claimed in claim 1, the improvement wherein the compositions of the several layers differ from one another.

21. In a storage battery as claimed in claim 1, the improvement wherein the fibers in the separator have a mean length which is only 10% shorter than the mean length of fibers in a mat suitable for use to produce a separator by the wet laid process.

22. An improved storage battery as claimed in claim 21 which is a lead acid battery.

23. An improved storage battery as claimed in claim 22 which is a VRLA battery.

24. An improved storage battery as claimed in claim 23 in which the separator consists essentially of glass fibers.

25. In a storage battery as claimed 1, the improvement of a fibrous sheet plate separator which consists essentially of intermeshed glass fibers produced by suspending glass fibers in a gaseous medium, collecting the suspended glass fibers on a foraminous material, and separating the collected fibers from the foraminous material, with the proviso that the fibers suspended and collected have a BET surface are of from 0.2 to 5 $m^2$ per gram, and with the further provisos that the separator has a mean fiber length equal to the original fiber length of a fiber made and collected for a wet laid process.

26. An improved storage battery as claimed in claim 25 which is a lead acid battery.

27. An improved storage battery as claimed in claim 26 which is a VRLA battery.

28. In a storage battery as claimed 1, the improvement of a fibrous sheet plate separator which consists essentially of intermeshed glass fibers produced by suspending glass fibers in a gaseous medium, collecting the suspended glass fibers on a foraminous material, and separating the collected fibers from the foraminous material, with the proviso that the fibers suspended and collected have a BET surface area of from 0.2 to 5 $m^2$ per gram, and the further proviso that the mean length of the fibers in the separator is greater than the mean length of fibers manufactured for use to produce a separator by a wet laid process.

29. An improved storage battery as claimed in claim 25 which is a lead acid battery.

30. An improved storage battery as claimed in claim 26 which is a VRLA battery.

* * * * *